United States Patent
Luo et al.

(10) Patent No.: US 12,363,680 B2
(45) Date of Patent: Jul. 15, 2025

(54) TECHNIQUES FOR SUPPORTING DYNAMIC FREQUENCY DIVISION MULTIPLEXING WITHIN CARRIER

(71) Applicant: QUALCOMM Incorporated, San Diego, CA (US)

(72) Inventors: Jianghong Luo, Skillman, NJ (US); Navid Abedini, Basking Ridge, NJ (US); Luca Blessent, Whitehouse Station, NJ (US); Karl Georg Hampel, Jersey City, NJ (US); Naeem Akl, Somerville, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 633 days.

(21) Appl. No.: 17/682,266

(22) Filed: Feb. 28, 2022

(65) Prior Publication Data
US 2022/0322299 A1    Oct. 6, 2022

Related U.S. Application Data

(60) Provisional application No. 63/168,014, filed on Mar. 30, 2021.

(51) Int. Cl.
*H04W 72/02* (2009.01)
*H04W 72/04* (2023.01)
*H04W 72/0446* (2023.01)
*H04W 72/23* (2023.01)
*H04W 88/14* (2009.01)

(52) U.S. Cl.
CPC ....... *H04W 72/02* (2013.01); *H04W 72/0446* (2013.01); *H04W 72/23* (2023.01); *H04W 88/14* (2013.01)

(58) Field of Classification Search
CPC .. H04W 72/02; H04W 72/23; H04W 72/0446
USPC .......................................................... 370/329
See application file for complete search history.

(56) References Cited

U.S. PATENT DOCUMENTS

| 2022/0061006 A1* | 2/2022 | Liu ..................... H04B 7/15542 |
| 2023/0164793 A1* | 5/2023 | Ghanbarinejad ..... H04L 5/0094 370/329 |

(Continued)

OTHER PUBLICATIONS

3GPP TS 38.213: "3rd Generation Partnership Project, Technical Specification Group Radio Access Network, NR, Physical Layer Procedures for Control (Release 16)", 3GPP Standard, Technical Specification, Mobile Competence Centre, 650, Route Des Lucioles, F-06921 Sophia-Antipolis Cedex, France, vol. RAN WG1, No. V16.4.0, Jan. 8, 2021, pp. 1-181, XP051999687, URL: https://ftp.3gpp.org/Specs/archive/38_series/38.213/38213-g40.zip 38213-g40.docx.

(Continued)

*Primary Examiner* — Faisal Choudhury
(74) *Attorney, Agent, or Firm* — Arent Fox, LLP

(57) ABSTRACT

Aspects described herein relate to providing dynamic frequency division multiplexing (FDM) within a component carrier (CC) for use by integrated access and backhaul (IAB) nodes. A configuration can be communicated for each cell of the IAB node indicating multiple resource availability combinations with each resource availability combination corresponding to resource block (RB) sets over multiple slots. A downlink control information (DCI) indicating one resource availability combination of the multiple resource availability combinations for one or more cells of the IAB node can be communicated as well. The IAB node can communicate, in a slot, over one or more RB sets of the multiple configured RB sets in symbols indicated as available by the one resource availability combination.

30 Claims, 12 Drawing Sheets

(56) References Cited

U.S. PATENT DOCUMENTS

| | | | |
|---|---|---|---|
| 2023/0309067 A1* | 9/2023 | You | H04W 72/044 |
| 2023/0318798 A1* | 10/2023 | Su | H04W 72/54 |
| | | | 370/329 |
| 2024/0064733 A1* | 2/2024 | Ghanbarinejad | H04L 5/0094 |
| 2024/0146480 A1* | 5/2024 | Ghanbarinejad | H04L 5/0051 |

OTHER PUBLICATIONS

3GPP TS 38.331: "3rd Generation Partnership Project, Technical Specification Group Radio Access Network, NR, Radio Resource Control (RRC) Protocol Specification (Release 16)", 3GPP Draft, Draft_38331-G40_V2, V16.4.0, Mobile Competence Centre, 650, Route Des Lucioles, F-06921 Sophia-Antipolis Cedex, France, Mar. 29, 2021, 950 Pages, XP051990854, URL: https://ftp.3gpp.org/tsg_ran/WG2_RL2/Specifications/202103_draft_specs_after_RAN_91/Draft_38331-g40_v2.docx.
Intel Corporation: "Enhancements to Resource Multiplexing between Child and Parent Links of an IAB Node", 3GPP TSG RAN WG1 #104-e, R1-2100670, 3GPP, Mobile Competence Centre, 650, Route Des Lucioles, F-06921 Sophia-Antipolis Cedex, France, vol. RAN WG1, No. e-Meeting, Jan. 25, 2021-Feb. 5, 2021, 8 Pages, Jan. 19, 2021, XP051971140, URL: https://ftp.3gpp.org/tsg_ran/WG1_RL1/TSGR1_104-e/Docs/R1-2100670.zip R1-2100670.docx.
International Search Report and Written Opinion—PCT/US2022/070901—ISA/EPO—Jun. 10, 2022.

* cited by examiner

TECHNIQUES FOR SUPPORTING DYNAMIC FREQUENCY DIVISION MULTIPLEXING WITHIN CARRIER

CLAIM OF PRIORITY UNDER 35 U.S.C. § 119

The present Application for Patent claims priority to Provisional Patent Application No. 63/168,014, entitled "TECHNIQUES FOR SUPPORTING DYNAMIC FREQUENCY DIVISION MULTIPLEXING WITHIN CARRIER" filed Mar. 30, 2021, which is assigned to the assignee hereof and hereby expressly incorporated by reference herein for all purposes.

BACKGROUND

Aspects of the present disclosure relate generally to wireless communication systems, and more particularly, to communicating using dynamic frequency division multiplexing (FDM).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In wireless communication technologies such as 5G NR, integrated access and backhaul (IAB) networks can include IAB nodes that communicate with one another and/or with upstream IAB donor nodes or downstream user equipment (UE). The IAB nodes can communicate with upstream nodes using a mobile termination (MT) function and can communicate with downstream nodes using a distributed unit (DU) function, which is distributed from a centralized unit (CU) function at an IAB donor node. The CU can schedule communications and/or associated resources in time and/or frequency for various downstream IAB nodes or UEs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication at an integrated access and backhaul (IAB) node is provided that includes receiving, from an upstream node, a configuration, originated by an IAB donor, for each cell of the IAB node indicating multiple resource availability combinations with each resource availability combination over multiple slots, wherein each item in each resource availability combination indicates a resource availability for one or more selected resource block (RB) sets of multiple configured RB sets in one slot, receive, from the upstream node, a downlink control information (DCI) indicating one resource availability combination of the multiple resource availability combinations for one or more cells of the IAB node, and communicate, by the one or more cells of the IAB node and in the one slot, over the one or more selected RB sets in symbols indicated as available by the one resource availability combination.

In another example, a method for wireless communication at a node is provided that includes transmitting, to a downstream IAB node, a configuration for each cell of the downstream IAB node indicating multiple resource availability combinations with each resource availability combination over multiple slots, wherein each item in each resource availability combination indicates a resource availability for one or more selected RB sets of multiple configured RB sets in one slot, and transmitting, to the downstream IAB node, a downlink control information (DCI) indicating one resource availability combination of the multiple resource availability combinations for one or more cells of the downstream IAB node.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
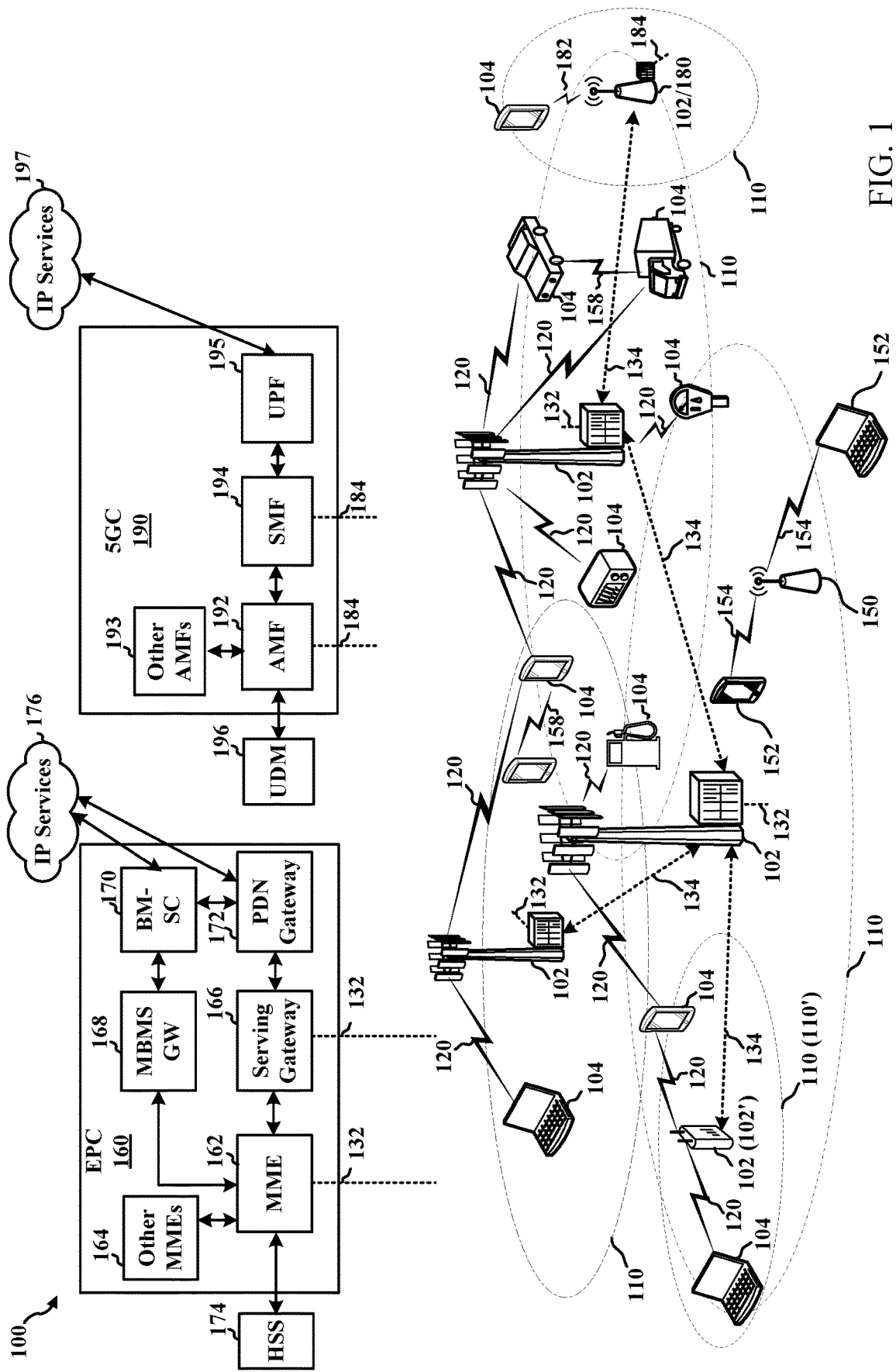
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to enabling communications for nodes of a wireless network using dynamic frequency division multiplexing (FDM) within a component carrier (CC). For example, within a CC, different sets of resource blocks (RBs) can be allocated to a node for wireless communications. An upstream node that configures the node can indicate a configuration associated with determining whether the different sets of RBs are allocated to the node or not.

In some wireless communication technologies, such as fifth generation (5G) new radio (NR), an integrated access and backhaul (IAB) network can be provided that includes multiple IAB nodes that communicate with one another. The IAB nodes may communicate directly, or indirectly (e.g., via one or more other IAB nodes), with an IAB donor. The IAB donor can include a centralized unit (CU) that schedules or allocates resources for IAB nodes, e.g., for one or more associated cells of the IAB nodes, that are downstream from the IAB donor. The CU can schedule or allocate time and/or frequency resources. For example, the resources can include sets of resource blocks (RBs) within one or more symbols, where a symbol can be an orthogonal frequency division multiplexing (OFDM) symbol, a single-carrier FDM (SC-FDM) symbol, etc. The symbol can include a portion of frequency, such as a CC, defined over a period of time. The symbol can be divided into multiple RBs in frequency. In addition, the resources can include one or more slots, where each slot includes multiple symbols.

Aspects described herein relate to an IAB node using dynamically allocated frequency resources for wireless communications. In one aspect, an upstream node can allocate the frequency resources for the IAB node and/or for various IAB nodes to facilitate dynamic FDM multiplexing of communications for IAB nodes within a CC. The IAB node can receive a configuration from the upstream node that may indicate multiple resource availability combinations that may be available for allocating to the IAB node, and the IAB node can receive another indication of one or more of the multiple resource availability combinations to be used by the IAB node in communicating in the wireless network. In aspects described herein, the IAB node can receive an indication to use a portion of frequency resources (e.g., one or more RB sets) within a CC that may not include all RBs in the CC. For example, the configuration of multiple resource availability combinations can indicate that the combinations apply to one or more specific RB sets. In another example, the indication of the one or more resource availability combinations to use, or another signal received by the IAB node, can indicate the one or more specific RB sets to which the one or more resource availability combinations are to apply.

Enabling dynamic FDM resource allocation in this regard can allow for enhanced duplex capability with simultaneous operation of IAB nodes, such as space division multiplexing (SDM) half-duplex and SDM full-duplex, which can increase communication throughput of the IAB nodes. In addition, the dynamic FDM resource allocation within a CC can allow for multiplexing communications of multiple IAB nodes within the CC, which can also increase communication throughput of the IAB nodes. Increases in throughput can be extended to downstream nodes and devices, such as UEs communicating with the IAB nodes, which can improve user experience at the UE.

The described features will be presented in more detail below with reference to FIGS. 1-12.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more CCs. The base stations 102/UEs 104 may use spectrum up to Y MHz (e.g., 5, 10, 15, 20, 100, 400, etc. MHz) bandwidth per CC allocated in a carrier aggregation of up to a total of Yx MHz (e.g., for x CCs) used for transmission in the DL and/or the UL direction. The CCs may or may not be adjacent to each other. Allocation of CCs may be asymmetric with respect to DL and UL (e.g., more or less CCs may be allocated for DL than for UL). The CCs may include a primary CC and one or more secondary CCs. A primary CC may be referred to as a primary cell (PCell) and a secondary CC may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
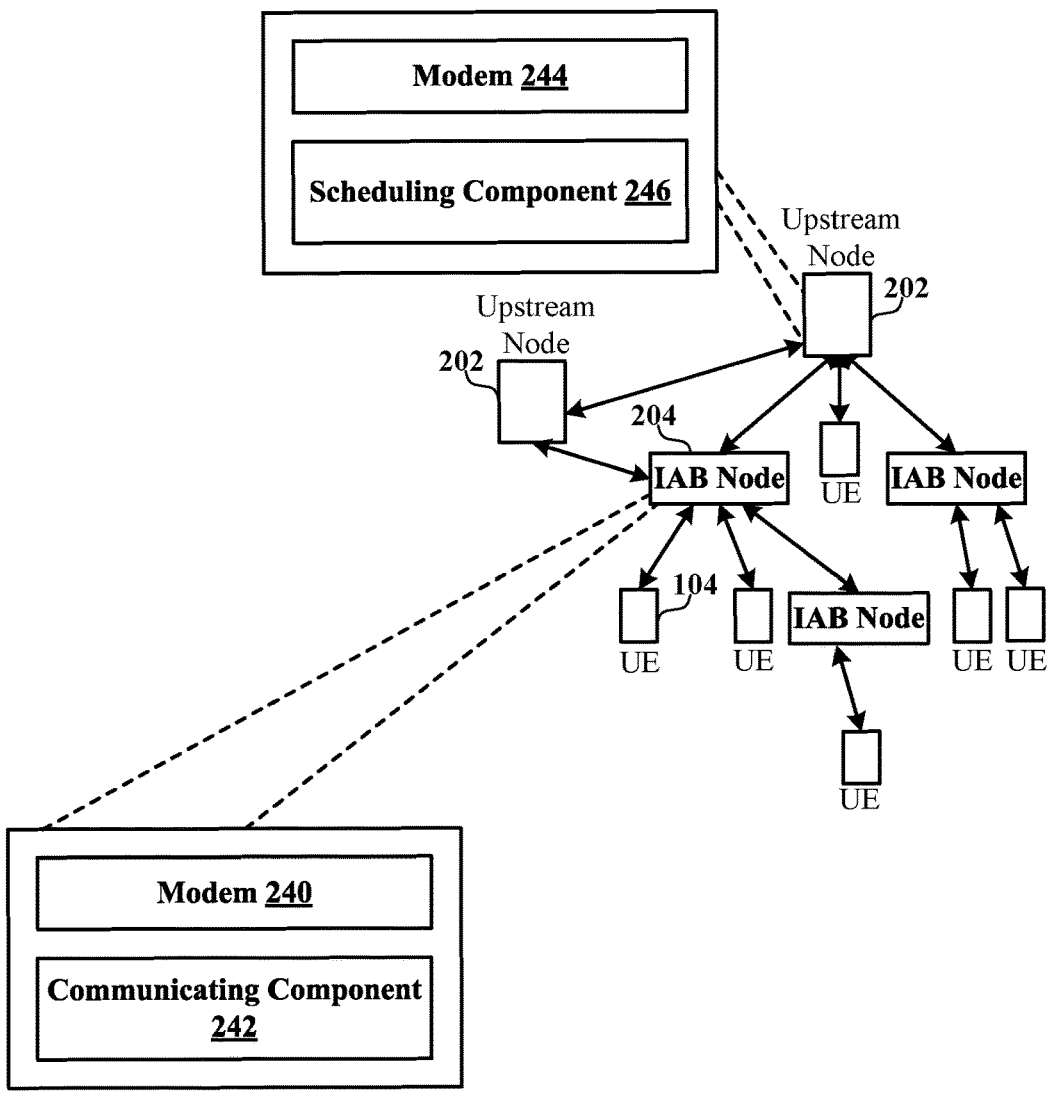
FIG. 2 illustrates an example of a wireless communication system that provides integrated access and backhaul (IAB) nodes for facilitating communications between upstream and downstream nodes, in accordance with various aspects of the present disclosure.

Referring to FIG. 2, in accordance with various aspects described herein, an example of another wireless communication access network 200 that include IAB nodes is depicted. The wireless communication access network 200 can include one or more upstream nodes 202, which can include a gNB or other base station (e.g., base station 102), IAB node, IAB donor, CU, DU, etc. that can communicate with one or more UEs 104 and/or IAB nodes 204.

The IAB nodes 204 can be positioned between the one or more upstream nodes 202 (and/or one or more intermediate upstream IAB nodes) and a UE 104 (and/or one or more intermediate downstream IAB nodes). In an example, the IAB nodes 204 may operate in half duplex or full duplex, as described further herein. In an aspect, the IAB node 204 can include a modem 240 and a communicating component 242 for communicating in a wireless network over dynamically allocated frequency resources within a CC. In addition, in an aspect, the upstream node 202 can include a modem 244 and a scheduling component 246 for scheduling downstream IAB nodes for communicating in the wireless network over the dynamically allocated frequency resources within the CC. In an example, the upstream node 202 can be a IAB donor with a CU that schedules the downstream IAB nodes, or the upstream node can be an IAB node where scheduling may originate from an IAB donor or other node with a CU that is upstream from the upstream node 202.

Figure 3:
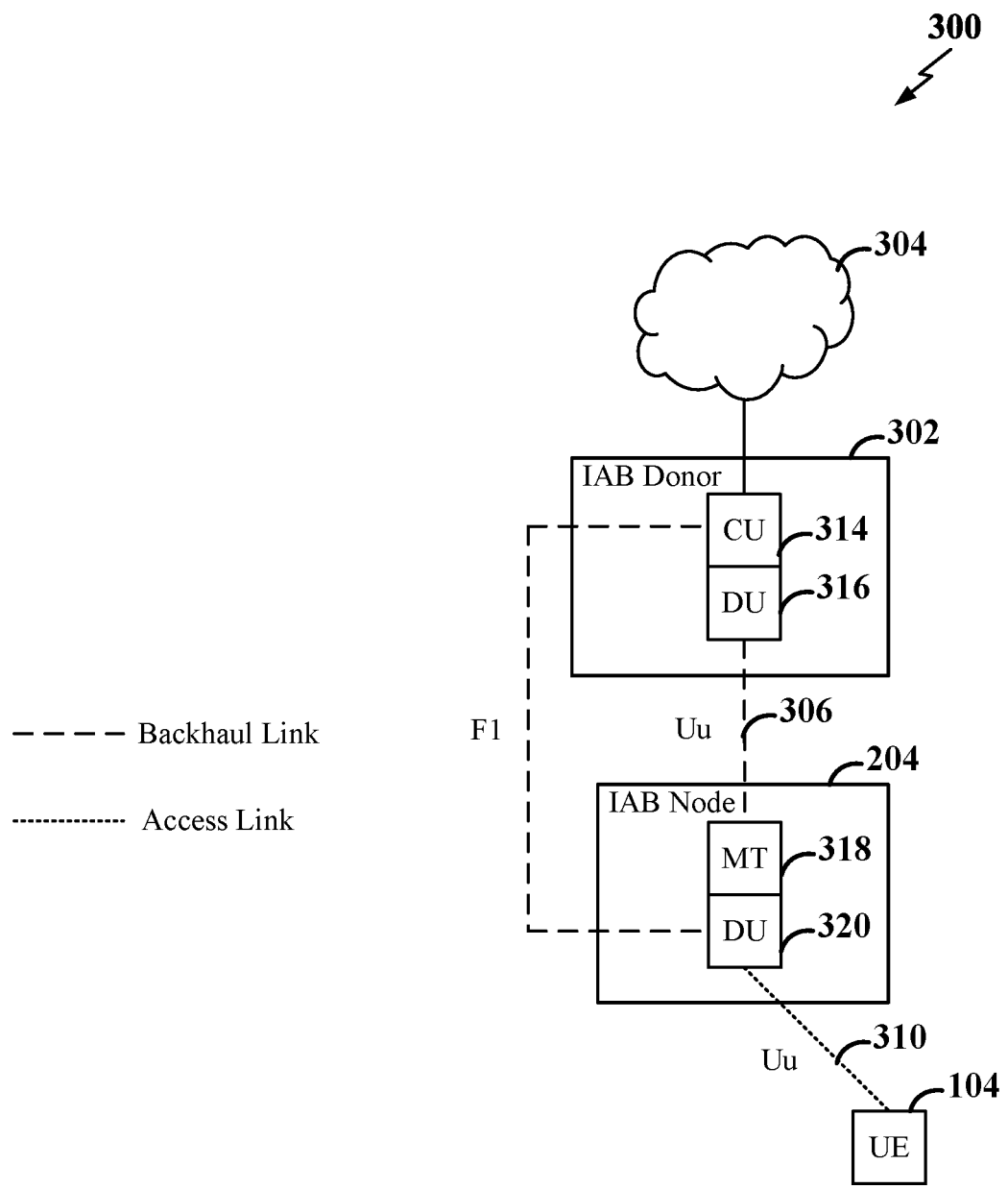
FIG. 3 illustrates an example of a wireless communication network that includes an integrated access and backhaul (IAB) network, in accordance with various aspects of the present disclosure.

In some wireless communication networks, the functionality of the base stations and/or other components of the network may be distributed across multiple entities. FIG. 3 illustrates an example of a wireless communication network 300 that may be utilized in some aspects of the disclosure. In this example, wireless communication network 300 can include an IAB network having a network entity such as a IAB donor 302 is coupled to a remote network 304, such as a main backhaul network or mobile core network (e.g., EPC, 5GC, etc.). In the wireless communication network 300, wireless spectrum may be used for a backhaul (BH) link 306 between the IAB donor 302 (or other upstream node) and a IAB node 204 and for an access link 310 between the IAB node 204 and a UE 104 (or other downstream node). The BH link 306 may be conducted over a Uu interface or other suitable wireless communication interface between an upstream node DU (e.g., DU 316 of IAB donor 302 in this example) and the MT 318 of IAB node 204. In addition, there may be a F1 interface or other suitable interface between a CU 314 of IAB donor 302 and the DU 320 of IAB node 204. In addition, for example, the access link 310 may be similar to the BH link 306 between the TAB node 204 and its upstream node (e.g., TAB donor 302 in this example), and may be conducted over a Uu radio interface or some other suitable wireless communication interface. In some examples, the wireless spectrum may utilize mmW frequencies and/or sub-6 GHz carrier frequencies. In an example, the TAB donor 302 may include a wired (e.g., fiber, coaxial cable, Ethernet, copper wires), microwave, or another suitable link to the remote network 304.

In some examples (e.g., as shown in FIG. 3), the TAB donor 302 may include a CU 314 and one or more DUs 316. The CU 314 can be configured to operate as a centralized network node (or central entity) within the wireless communication network 300. For example, the CU 314 may include radio resource control (RRC) layer functionality and packet data convergence protocol (PDCP) layer functionality to control/configure the other nodes (e.g., TAB nodes or UEs) within the network 300. In some aspects, RRC signaling may be used for various functions including, as one example, setting up and releasing user data bears. In some examples, RRC signaling messages may be transported over signaling bearers (e.g., SRB 1 and SRB 2).

The DU 316 can be configured to operate as a scheduling entity to schedule scheduled entities (e.g., TAB nodes or UEs) of the base station 102 with frequency and/or time resources for wireless communications. For example, the DU 316 may operate as a scheduling entity to schedule the TAB node 204 and the UE 104. In some examples, the DU 316 may include radio link control (RLC), medium access control (MAC), and physical (PHY) layer functionality to enable operation as a scheduling entity.

An F1 interface can provide a mechanism to interconnect the CU 314 (e.g., PDCP layer and higher layers) and the DU 316 (e.g., RLC layer and lower layers). In some aspects, an F1 interface may provide control plane and user plane functions (e.g., interface management, system information management, UE context management, RRC message transfer, etc.). F1AP is an application protocol for F1 that defines signaling procedures for F1 in some examples. The F1 interfaces support F1-C on the control plane and F1-U on the user plane.

To facilitate wireless communication between the TAB donor 302 (or remote network 304) and the UEs (e.g., the UE 104), the TAB node 204 may be configured to operate as a scheduled entity. The TAB node 204 may include a mobile termination (MT) unit 318 to enable scheduled entity functionality. For example, the MT unit 318 may include UE functionality to connect to a upstream node (which can be the TAB donor 302 or another IAB node) and to be scheduled by the upstream node with frequency and/or time resources for wireless communications. The IAB node 204 also includes a DU 320 that facilitate communication between the IAB donor 302 (or other upstream node or remote network 304) and the UE 104. In an example, the DU 320 can include one or more cells to facilitate communicating with one or more UEs or other downstream IAB nodes.

Figure 4:
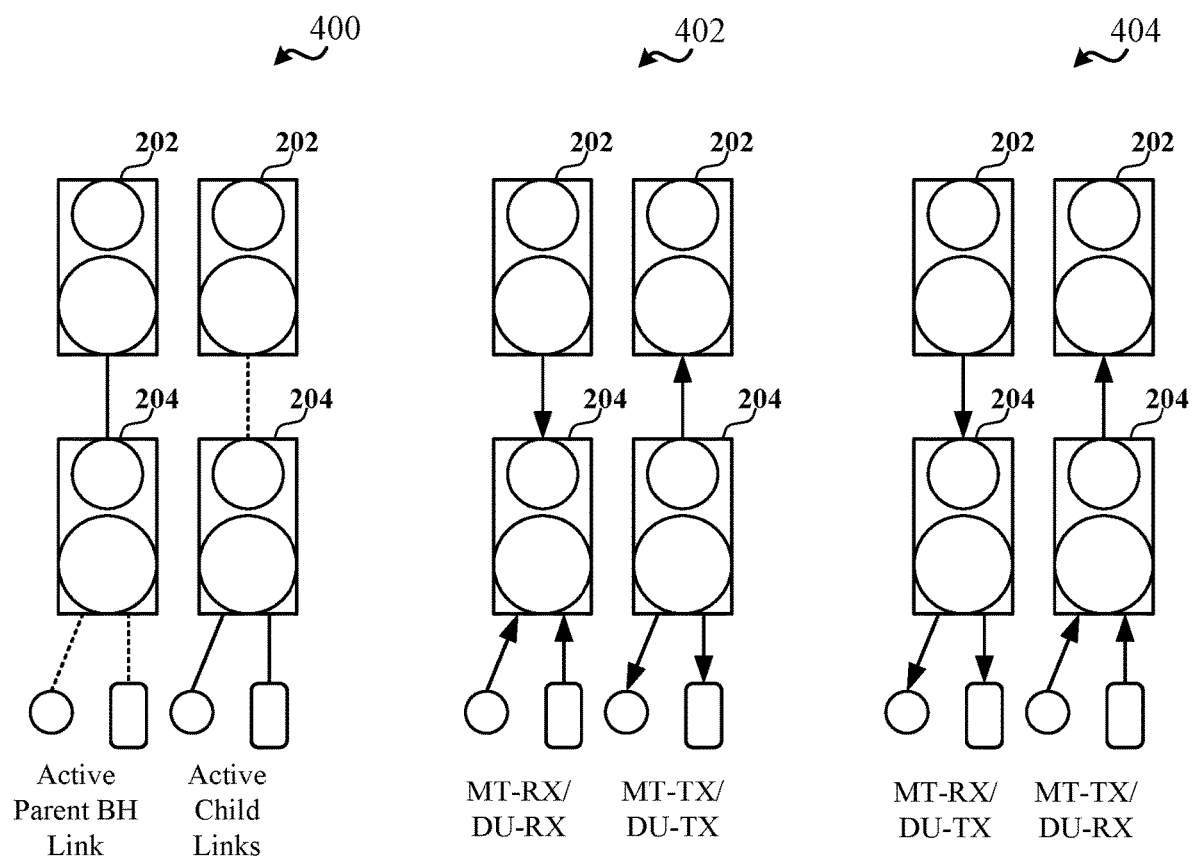
FIG. 4 illustrates examples of duplexing configurations in an IAB network, in accordance with various aspects of the present disclosure.

FIG. 4 illustrates examples of configurations of duplex capabilities of IAB nodes. In a time division multiplexed (TDM) configuration 400, at a given point in time, the IAB node 204 can either have an active parent BH link with the upstream node 202 or active child links with UEs and/or other downstream IAB nodes. Enhanced duplex capability may be supported in some examples for allowing simultaneous operations over a pair of MT CC and DU cell. For example, in SDM half-duplex configuration 402, the IAB node 204 can, at a given point in time, simultaneously communicate using MT-RX (with upstream node 202) and DU-RX (with downstream nodes) or simultaneously communicate using MT-TX (with upstream node 202) and DU-TX (with downstream nodes). In SDM full-duplex configuration 404, for example, the IAB node 204 can, at a given point in time, simultaneously communicate using MT-RX (with upstream node 202) and DU-TX (with downstream nodes) and/or simultaneously communicate using MT-TX (with upstream node 202) and DU-RX (with downstream nodes).

Figure 5:
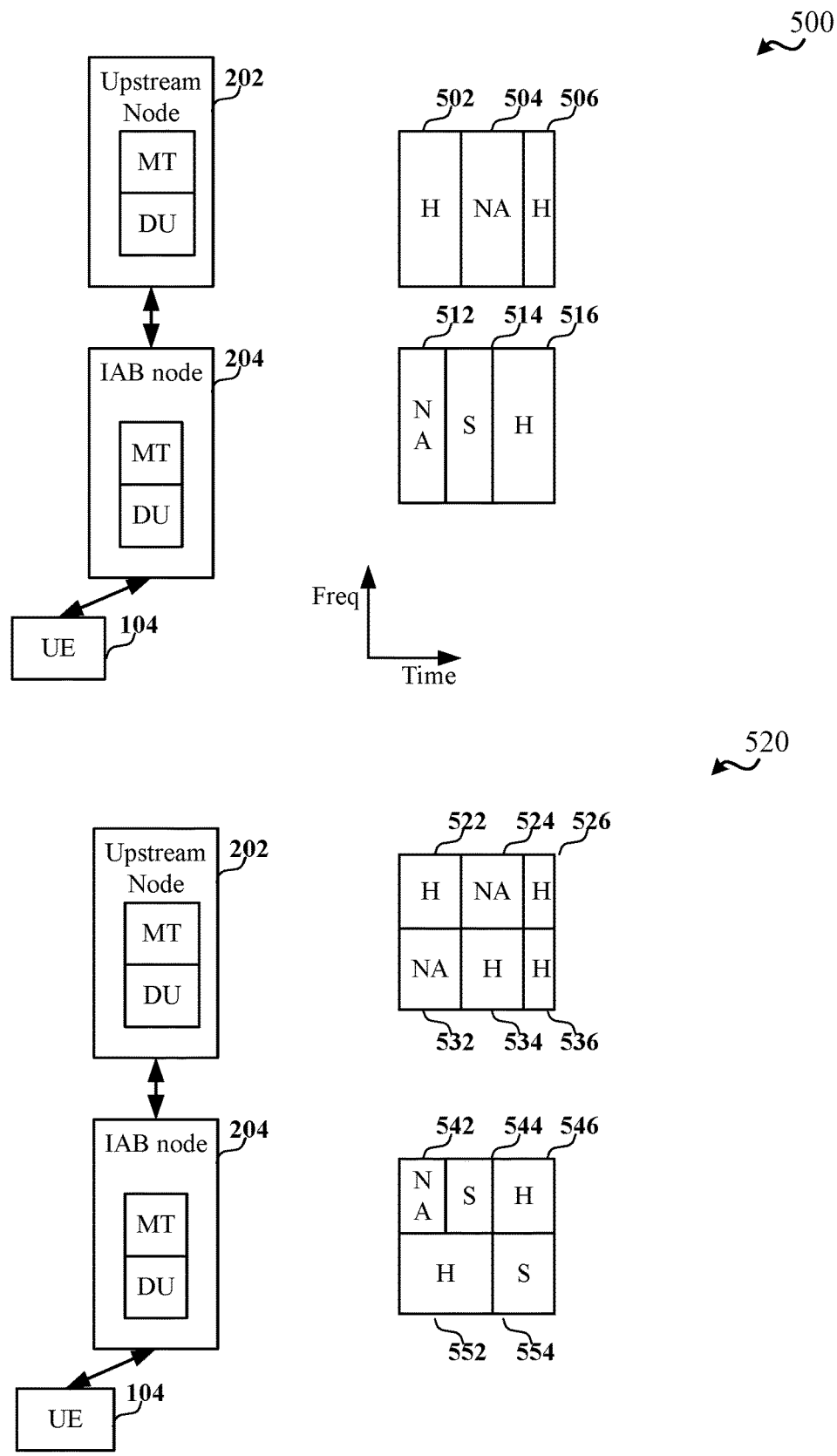
FIG. 5 illustrates an example of resource allocation in an IAB network, in accordance with various aspects of the present disclosure.

FIG. 5 illustrates examples of resource configurations for IAB nodes. In resource configuration 500, an upstream node 202 can schedule an IAB node 204 with a resource allocation of time and/or frequency resources for communicating with the upstream node 202 and a resource allocation of time and/or frequency resources for communicating with UE 104 (or other downstream node). In resource configuration 500, for example, upstream node 202 can configure the IAB node 204 with a resource allocation of one or more symbols 502 indicated as hard ("H"), which means the IAB node 204 can use the one or more symbols 502 for communicating with the upstream node 202, one or more symbols 504 indicated as not available ("NA"), which means the IAB node 204 cannot use the one or more symbols 504 for communicating with the upstream node 202, and one or more other symbols 506 indicated as H, where the symbol(s) 502, 504, 506 can be consecutive in time and can comprise one CC. In addition, in resource configuration 500, for example, upstream node 202 can configure the IAB node 204 with a resource allocation of one or more symbols 512 indicated as NA, one or more symbols 514 indicated as soft ("S"), which means the IAB node 204 can conditionally use the one or more symbols 514 for communicating with the upstream node 202, and one or more other symbols 516 as H, where the symbol(s) 502, 504, 506 can be consecutive in time and can comprise one CC. In an example, for symbols indicated as S, the upstream node 202 or another node can dynamically control whether the symbols are used for communications between the IAB node 204 and the upstream node 202 using an explicit indication (e.g., via downlink control information (DCI) 2_5, an implicit determination without impact to MT, etc.). In this regard, for example, FDM granularity of a CC (in terms of a DU cell) can be supported by semi-static resource configuration, which can configure symbols as H, NA, or S, and dynamic signaling, such as DCI 2_5, for dynamic availability indication to indicate whether S symbols can be used.

In an example, upstream node 202 can transmit the semi-static resource configuration using RRC signaling. The RRC signaling and/or the configuration may originate at the upstream node 202 where the upstream node 202 is an IAB donor or otherwise has a CU, or may originate from a node that is upstream to the upstream node, etc. The semi-static resource configuration may include an availability combination table (e.g., AvailabilityCombinationsPerCell table defined in 5G NR), where the table may have rows that correspond to multiple resource availability combinations identified by an index (e.g., 0 . . . 511) and columns for slot index (e.g., 0 . . . 255) corresponding to slots in time, such that a given resource availability combination can define resource availability values for each of multiple slots (e.g., up to 256 slots). The resource availability values can include one of the following values 0-7 for a given slot in a given resource availability combination, which is defined as a resourceAvailability table in 5G NR (e.g., in third generation partnership project (3GPP) technical specification (TS) 38.213):

| Value | Indication |
|---|---|
| 0 | No indication of availability for soft symbols |
| 1 | DL soft symbols are indicated available |
|   | No indication of availability for UL and flexible soft symbols |
| 2 | UL soft symbols are indicated available |
|   | No indication of availability for DL and flexible soft symbols |
| 3 | DL and UL soft symbols are indicated available |
|   | No indication of availability for flexible soft symbols |
| 4 | Flexible soft symbols are indicated available |
|   | No indication of availability for DL and UL soft symbols |
| 5 | DL and flexible soft symbols are indicated available |
|   | No indication of availability for UL soft symbols |
| 6 | UL and flexible soft symbols are indicated available |
|   | No indication of availability for DL soft symbols |
| 7 | DL, UL, and flexible soft symbols are indicated available |

In an example, upstream node 202 can transmit a group common physical downlink control channel (PDCCH) that can indicate, in DCI format 2_5 and for a given IAB node or one or more cells of the IAB node, the availability combination index into the AvailabilityCombinationsPerCell table. Accordingly, IAB node 204 can determine which resources are available in a slot given the index indicated in the DCI format 2_5 and the value for the resource availability table at the slot index in the row that corresponds to the index.

Aspects described herein relate to defining resource allocation granularity for frequency domain resources within a CC (e.g., starting point as a set of N RBs), which can include frequency-domain extension for soft resources, and enhancements for DCI format 2_5 to support dynamic indication of availability for soft frequency resources. In an example, an upstream node 202 can configure the resources in this regard using separate indication of time and frequency resources (e.g., different field, radio network temporary identifier (RNTI) or different DCI), or joint indication of time and frequency resources (e.g., extension of FDM across CCs, possible restrictions on band/minimum bandwidth for FDM operation (e.g. FR2 100 MHz+ etc.)).

In an example, frequency-domain resource management within a CC can be supported by allocation RB sets, which may be similar to a concept of bandwidth part (BWP) of a DU cell. For example, separate time-domain H/S/NA configuration can be applied per BWP (e.g., per RB set) of a DU cell such to extend IAB resource management framework from per DU cell to per "DU RB set," where a "DU RB set" can be configured by CU as a set of consecutive RBs within a DU cell. In another example, existing time-domain H/S/NA configuration and an additional second configuration across BWPs (e.g., RB sets) can be used with each BWP (e.g., RB set) indicated with a type value, such that the interpretation of time-domain H/S/NA at a BWP (e.g., RB set) can depend on the type value indicated for that BWP (e.g., RB set).

In an example, in resource configuration 520, an upstream node 202 can schedule an IAB node 204 with a resource allocation for communicating with the upstream node 202 and a resource allocation for communicating with UE 104 (or other downstream node). In resource configuration 520, for example, upstream node 202 can configure the IAB node 204 with a resource allocation of one or more RB sets 522 of a first set of one or more symbols indicated as H and one or more RB sets 532 of the first set of one or more symbols indicated as NA, where the one or more RB sets 522 and one or more RB sets 532 may be within a CC. In addition, resource configuration 520, for example, upstream node 202 can configure the IAB node 204 with a resource allocation of one or more RB sets 524 of a second set of one or more symbols indicated as NA and one or more RB sets 534 of the second set of one or more symbols indicated as H, one or more RB sets 526 of a third set of one or more symbols indicated as H and one or more RB sets 536 of the third set of one or more symbols indicated as H. In addition, in resource configuration 520, for example, upstream node 202 can configure the IAB node 204 with a resource allocation of one or more RB sets 542 of a first set of one or more symbols indicated as NA, one or more RB sets 544 of a second set of one or more symbols indicated as S, and one or more RB sets 552 of a set of one or more symbols, which can include the first and second set of one or more symbols, indicated as H, one or more RB sets 546 of a third set of one or more symbols indicated as H and one or more RB sets 554 of the third set of one or more symbols indicated as S. Aspects described herein relate to signaling to support dynamic FDM within a CC (e.g., dynamically signaling whether the RB sets 544 for S symbol(s) and/or the RB sets 554 for S symbol(s) can be used by the IAB node 204).

Figure 6:
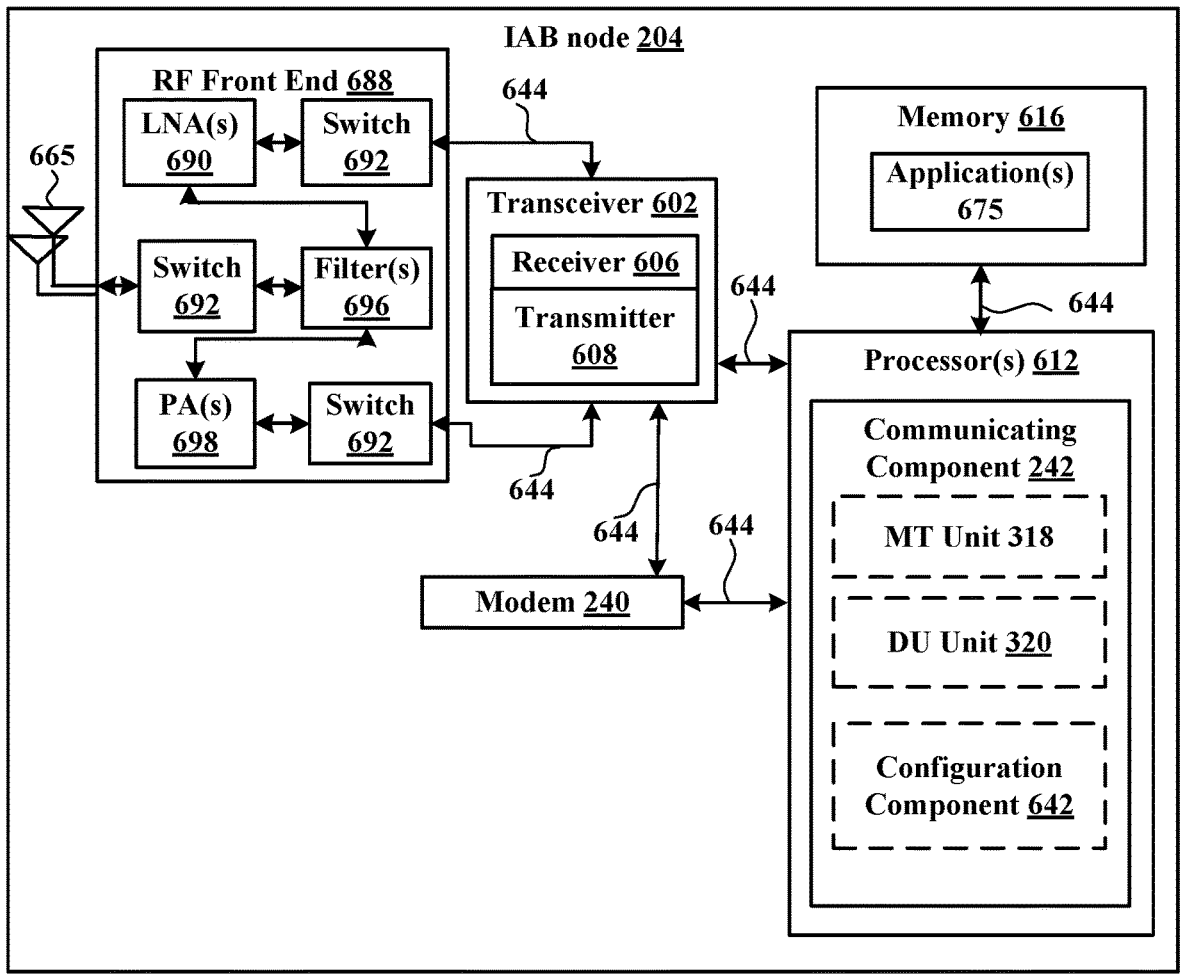
FIG. 6 is a block diagram illustrating an example of an IAB node, in accordance with various aspects of the present disclosure.
Figure 7:
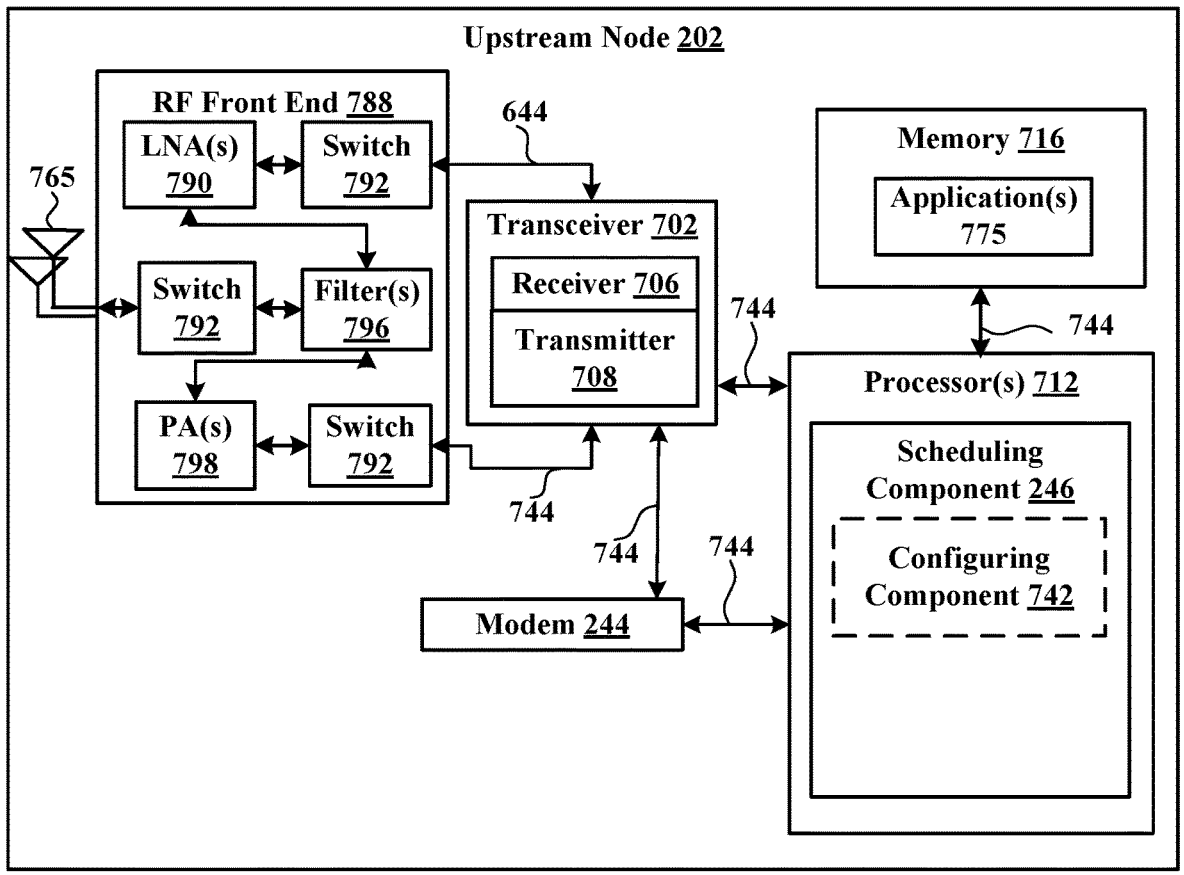
FIG. 7 is a block diagram illustrating an example of an upstream node, in accordance with various aspects of the present disclosure.
Figure 8:
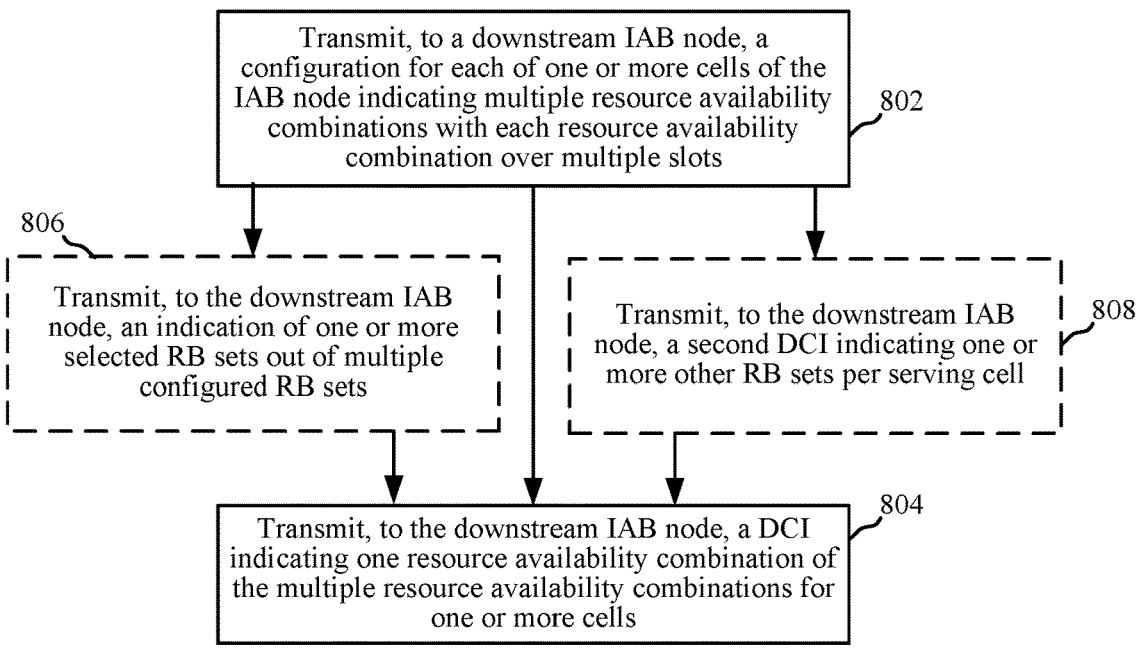
FIG. 8 illustrates a flow chart of an example of a method for communicating based on a resource allocation for an IAB node, in accordance with various aspects of the present disclosure.
Figure 9:
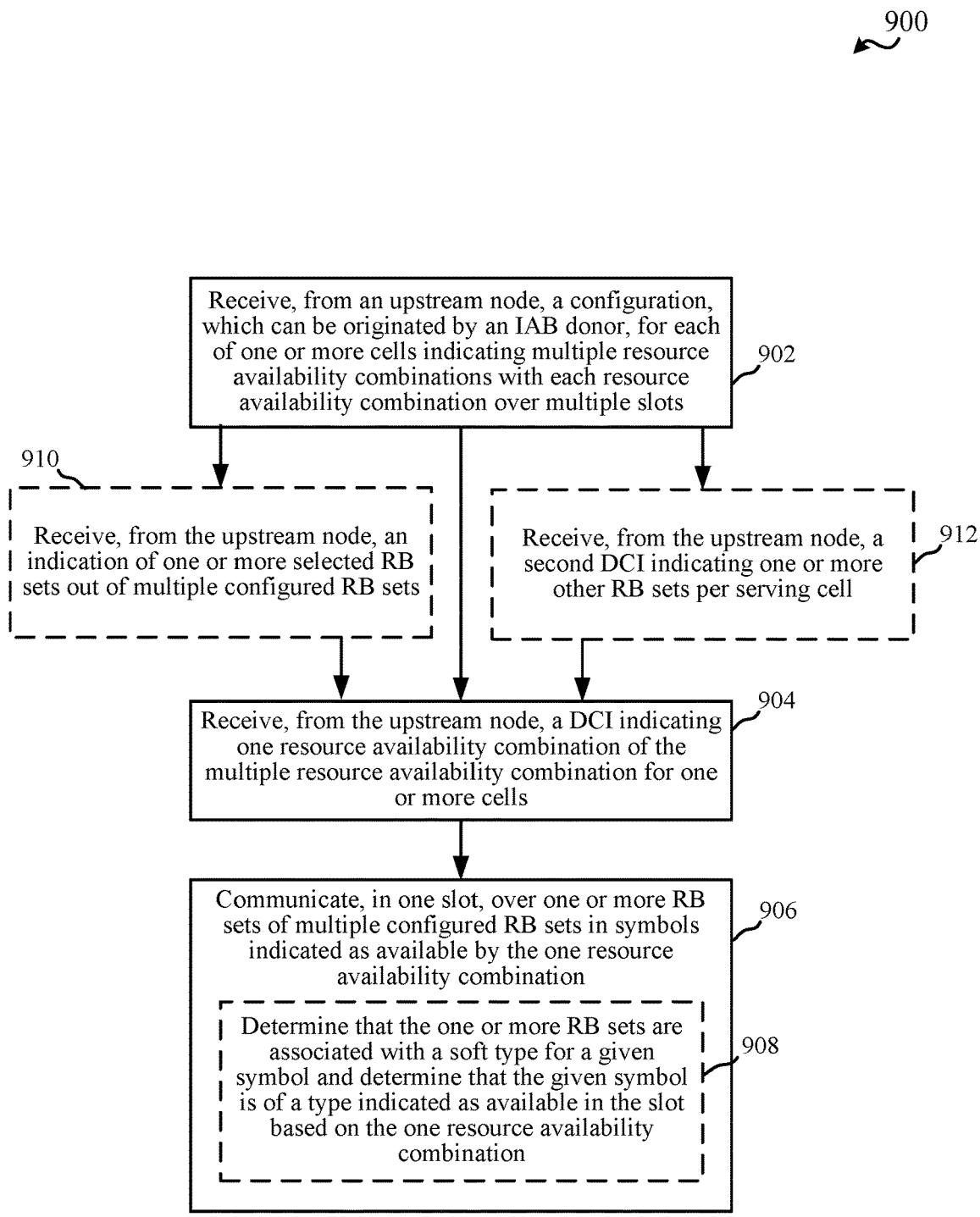
FIG. 9 illustrates a flow chart of an example of a method for providing a resource allocation to an IAB node for wireless communications, in accordance with various aspects of the present disclosure.

Turning now to FIGS. 6-12, aspects are depicted with reference to one or more components and one or more methods that may perform the actions or operations described herein, where aspects in dashed line may be optional. Although the operations described below in FIG. 8-9 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 6, one example of an implementation of a IAB node 204 may include a variety of components, some of which have already been described above and are described further herein, including components such as one or more processors 612 and memory 616 and transceiver 602 in communication via one or more buses 644, which may operate in conjunction with modem 240 and/or a communicating component 242 for communicating using dynamic FDM within a CC. For example, communicating component 242 can optionally include a MT unit 318 for communicating control information with one or more upstream nodes, a DU unit 320 for communicating with one or more downstream nodes, and/or a configuration component 642 for receiving one or more configurations indicating resource availability combinations to be used in communicating with the upstream node(s) and/or downstream node(s).

In an aspect, the one or more processors 612 can include a modem 240 and/or can be part of the modem 240 that uses one or more modem processors. Thus, the various functions related to communicating component 242 may be included in modem 240 and/or processors 612 and, in an aspect, can be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 240 associated with communicating component 242 may be performed by transceiver 602.

Also, memory 616 may be configured to store data used herein and/or local versions of applications 675 or communicating component 242 and/or one or more of its subcomponents being executed by at least one processor 612. Memory 616 can include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes defining communicating component 242 and/or one or more of its subcomponents, and/or data associated therewith, when IAB node 204 is operating at least one processor 612 to execute communicating component 242 and/or one or more of its subcomponents.

Transceiver 602 may include at least one receiver 606 and at least one transmitter 608. Receiver 606 may include hardware, firmware, and/or software code executable by a processor for receiving data, the code comprising instructions and being stored in a memory (e.g., computer-readable medium). Receiver 606 may be, for example, a radio frequency (RF) receiver. In an aspect, receiver 606 may receive signals transmitted by an upstream node, a downstream node, etc. Additionally, receiver 606 may process such received signals, and also may obtain measurements of the signals, such as, but not limited to, Ec/Io, SNR, reference signal received power (RSRP), received signal strength indicator (RSSI), etc. Transmitter 608 may include hardware, firmware, and/or software code executable by a processor for transmitting data, the code comprising instructions and being stored in a memory (e.g., computer-readable medium). A suitable example of transmitter 608 may including, but is not limited to, an RF transmitter.

Moreover, in an aspect, IAB node 204 may include RF front end 688, which may operate in communication with one or more antennas 665 and transceiver 602 for receiving and transmitting radio transmissions, for example, wireless communications transmitted by at least one upstream node 202 or wireless transmissions transmitted by a UE or other downstream node. RF front end 688 may be connected to one or more antennas 665 and can include one or more low-noise amplifiers (LNAs) 690, one or more switches 692, one or more power amplifiers (PAs) 698, and one or more filters 696 for transmitting and receiving RF signals.

In an aspect, LNA 690 can amplify a received signal at a desired output level. In an aspect, each LNA 690 may have a specified minimum and maximum gain values. In an aspect, RF front end 688 may use one or more switches 692 to select a particular LNA 690 and its specified gain value based on a desired gain value for a particular application.

Further, for example, one or more PA(s) 698 may be used by RF front end 688 to amplify a signal for an RF output at a desired output power level. In an aspect, each PA 698 may have specified minimum and maximum gain values. In an aspect, RF front end 688 may use one or more switches 692 to select a particular PA 698 and its specified gain value based on a desired gain value for a particular application.

Also, for example, one or more filters 696 can be used by RF front end 688 to filter a received signal to obtain an input RF signal. Similarly, in an aspect, for example, a respective filter 696 can be used to filter an output from a respective PA 698 to produce an output signal for transmission. In an aspect, each filter 696 can be connected to a specific LNA 690 and/or PA 698. In an aspect, RF front end 688 can use one or more switches 692 to select a transmit or receive path using a specified filter 696, LNA 690, and/or PA 698, based on a configuration as specified by transceiver 602 and/or processor 612.

As such, transceiver 602 may be configured to transmit and receive wireless signals through one or more antennas 665 via RF front end 688. In an aspect, transceiver 602 may be tuned to operate at specified frequencies such that IAB node 204 can communicate with, for example, one or more upstream nodes (e.g., base stations 102, upstream IAB nodes, CUs, DUs, repeaters, etc.) or one or more cells associated with one or more upstream nodes, one or more downstream nodes (e.g., UEs 104, downstream IAB nodes, repeaters, etc.), and/or the like. In an aspect, for example, modem 240 can configure transceiver 602 to operate at a specified frequency and power level based on a configuration of the IAB node 204 and the communication protocol used by modem 240.

In an aspect, modem 240 can be a multiband-multimode modem, which can process digital data and communicate with transceiver 602 such that the digital data is sent and received using transceiver 602. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of IAB node 204 (e.g., RF front end 688, transceiver 602) to enable transmission and/or reception of signals from the network or UEs, upstream nodes or downstream nodes, etc. based on a specified modem configuration. In an aspect, the modem configuration can be based on the mode of the modem and the frequency band in use. In another aspect, the modem configuration can be based on configuration information associated with IAB node 204 as provided by the network during cell selection and/or cell reselection or initial access.

In an aspect, the processor(s) 612 may correspond to one or more of the processors described in connection with the IAB node 204 in FIG. 12. Similarly, the memory 616 may correspond to the memory described in connection with the IAB node 204 in FIG. 12.

Referring to FIG. 7, one example of an implementation of an upstream node 202, which may include a gNB or other base station, IAB donor, IAB node, CU, DU, etc., and which may include a variety of components, some of which have already been described above, but including components such as one or more processors 712 and memory 716 and transceiver 702 in communication via one or more buses 744, which may operate in conjunction with modem 244 to provide backhaul access to a core network. In addition, the one or more processors 712 and memory 716 and transceiver 702 etc. may optionally operate with a scheduling component 246 for scheduling IAB nodes or other downstream nodes for communication. In an example, scheduling component 246 can optionally include a configuring component 742 for configuring an IAB node to communicate with the upstream node 202 and/or other upstream nodes or downstream nodes.

The transceiver 702, receiver 706, transmitter 708, one or more processors 712, memory 716, applications 775, buses 744, RF front end 788, LNAs 790, switches 792, filters 796, PAs 798, and one or more antennas 765 may be the same as or similar to the corresponding components of IAB node 204, as described above, but configured or otherwise programmed for the upstream node as opposed to IAB node operations.

In an aspect, the processor(s) 712 may correspond to one or more of the processors described in connection with the upstream node in FIG. 12, as described. Similarly, the memory 716 may correspond to the memory described in connection with the upstream node in FIG. 12, as described.

FIG. 8 illustrates a flow chart of an example of a method 800 for configuring dynamic FDM resource allocations within a CC. FIG. 9 illustrates a flow chart of an example of a method 900 for utilizing dynamic FDM resource allocations within a CC. In an example, an upstream node 202 can perform one or more of the functions described in method 800 using one or more of the components described in FIGS. 2 and 7. In an example, an IAB node 204 can perform one or more of the functions described in method 900 using one or more of the components described in FIGS. 2 and 6. Methods 800 and 900 are described below in conjunction with one another to ease explanation of the associated functions and concepts. Methods 800 and 900 are not required to be performed in conjunction with one another, and indeed one device can be configured to perform method 800 without having a corresponding device that performs method 900 and vice versa, in at least one example.

In method 800, at Block 802, a configuration for each of one or more cells of a downstream IAB node can be transmitted to the downstream IAB node indicating multiple resource availability combinations with each resource combination over multiple slots. In an aspect, configuring component 742, e.g., in conjunction with processor(s) 712, memory 716, transceiver 702, scheduling component 246, etc., can transmit, to the downstream IAB node (e.g., IAB node 204), the configuration for each of one or more cells provided by the downstream IAB node 204, where the configuration can indicate multiple resource availability combinations with each resource availability combination over multiple slots. For example, configuring component 742 can transmit the configuration using RRC signaling, broadcast signaling, system information signaling, etc. The configuration may indicate the multiple resource availability combinations, which may be indicated using the tables or constructs described above (e.g., resourceAvailability table, AvailabilityCombinationsPerCell table) or tables or constructs similar thereto. In one example, the node transmitting the configuration can be the IAB donor transmitting to a downstream IAB node, which may or may not be the last IAB node to receive the configuration that can be originated at the IAB donor. In another example, if the node transmitting the configuration is not IAB donor CU, the node can be the last hop of relay nodes to transmit the configuration from the IAB donor CU to the downstream IAB node.

In method 900, at Block 902, a configuration, which can be originated by an IAB donor, for each of one or more cells can be received from an upstream node indicating multiple resource availability combinations with each resource combination over multiple slots. In an aspect, configuration component 642, e.g., in conjunction with processor(s) 612, memory 616, transceiver 602, communicating component 242, etc., can receive, from the upstream node (e.g., upstream node 202), a configuration, which can be originated by an IAB donor, for each of one or more cells provided by the IAB node 204, where the configuration can indicate multiple resource availability combinations with each resource availability combination over multiple slots. For example, configuration component 642 can receive the configuration in RRC signaling, broadcast signaling, system information signaling, etc. from the upstream node. In an example, if the upstream node itself is not IAB donor CU, the upstream node can be the last hop of relay nodes to transmit the configuration from the IAB donor CU to the IAB node 204.

In method 800, at Block 804, a DCI can be transmitted to the downstream IAB node indicating one resource availability combination of the multiple resource availability combinations for one or more cells. In an aspect, configuring component 742, e.g., in conjunction with processor(s) 712, memory 716, transceiver 702, scheduling component 246, etc., can transmit, to the downstream IAB node (e.g., IAB node 204), the DCI indicating one resource availability combination of the multiple resource availability combinations for one or more cells. For example, configuring component 742 can transmit the DCI in downlink control signaling (e.g., over a PDCCH). In an example, the DCI can be DCI format 2_5 in a group-common PDCCH to indicate which resource availability combination is configured for which cells of the downstream IAB node 204.

In method 900, at Block 904, a DCI indicating one resource availability combination of the multiple resource availability combinations for one or more cells can be received from the upstream node. In an aspect, configuration component 642, e.g., in conjunction with processor(s) 612, memory 616, transceiver 602, communicating component 242, etc., can receive, from the upstream node (e.g., upstream node 202), a DCI indicating one resource availability combination of the multiple resource availability combinations for one or more cells of the IAB donor node 204. For example, configuration component 642 can receive the DCI in downlink control signaling (e.g., over a PDCCH). In an example, the DCI can be DCI format 2_5 in a group-common PDCCH to indicate which resource availability combination is configured for which cells of the downstream IAB node 204, as described above and further herein.

In method 900, at Block 906, one or more RB sets of multiple configured RB sets can be communicated over, in one slot, in symbols indicated as available by the one resource availability combination. In an aspect, MT unit 318 or DU unit 320, e.g., in conjunction with processor(s) 612, memory 616, transceiver 602, communicating component 242, etc., can communicate, in one slot, over one or more RB sets of multiple configured RB sets in symbols indicated as available by the one resource availability combination. Thus, for example, MT unit 318 or DU unit 320 of the IAB node can use one or more RB sets indicated as available for communicating, in one or more cells of the IAB node 204, with one or more downstream or upstream nodes, as described further herein.

In one example, the configuration transmitted at Block 802 or received at Block 902 may indicate the multiple resource availability combinations, which may be indicated using the tables or constructs described above (e.g., resourceAvailability table, AvailabilityCombinationsPerCell table) or tables or constructs similar thereto, as described above and further herein. In one example, items in the configuration may indicate the resource availability for each resource availability combination for the one slot corresponding to all RB sets associated with a soft ("S") type, where the allocated resources may include resources in one or more RB sets, as described. For example, the configuration may include the AvailabilityCombinationsPerCell table, as described above and defined in 5G NR, that indicates various resource availability combination indices as rows of the table and corresponding columns of slot indices where the values (items) in each row/column element indicates whether all RB sets associated with a soft type are available for use or not. Thus, configuration component 642 can receive a resource allocation including one or more RB sets in one or more symbols indicated as S. In this example, configuration component 642 can determine whether it can use the one or more RB sets in the one or more symbols for communicating with the upstream node 202 or one or more downstream nodes based on the value.

For example, the same availability indication can be applied over all RB sets per symbol type (DL/UL/Flexible) in a slot. In this example, resource availability table in TS 38.213 can be redefined and existing signaling related to DCI 2_5 can remained unchanged. For example, configuring component 742 can transmit, or configuration component 642 can receive, the configuration as the AvailabilityCombinationsPerCell table indicating, for each of the multiple resource availability combinations, one of the above values for each of multiple slots. Configuration component 642 can then determine, for a given resource availability combination (e.g., as indicated in DCI), whether RB sets of symbols indicated as S in resource allocation from the upstream node are available for communicating with the upstream node 202 or one or more downstream nodes. Whether the RB sets are available can be further based on whether the symbols indicated as S are uplink, downlink, or flexible symbols, and the indication mapped to the value in the modified resourceAvailability table above. Where configuration component 642 determines that the RB sets are available, MT unit 318 can communicate with the upstream node 202 or DU unit 320 can communicate with one or more downstream nodes over the RB sets based on the symbol direction (uplink, downlink, or flexible).

Thus, in an example in communicating over the one or more RB sets at Block 906, optionally at Block 908, it can be determined that the one or more RB sets are associated with a soft type for a given symbol and determined that the given symbol is of a type indicated as available in the slot based on the one resource availability combination. In an aspect, configuration component 642, e.g., in conjunction with processor(s) 612, memory 616, transceiver 602, communicating component 242, etc., can determine that the one or more RB sets are associated with the soft ("S") type for a given symbol and determine that the given symbol is of a type indicated as available in the slot based on the one resource availability combination. For example, configuration component 642 can determine the one or more RB sets are associated with the soft type based on a resource configuration from the upstream node (e.g., as RB sets 544, 554 in FIG. 5). In addition, configuration component 642 can determine that the given symbol is of a type indicated as available in the slot based on the one resource availability combination, which can include determining the indication related to the value in the AvailabilityCombinationsPerCell table indicated for the one resource availability combination for the slot index corresponding to the slot that includes the given symbol.

In another example, the same availability indication can be applied over selected RB sets for a symbol type (downlink, uplink, or flexible) of a slot. The configuration, DCI or other signaling can be used to indicate the selected RB sets in this example. In one example, the selected RB sets can be indicated using a bitmap where each bit in the bitmap corresponds to one of previously RRC-configured RB sets. In this example, configuring component 742 can transmit, or configuration component 642 can receive, a RB configuration indicating configured RB sets, and the indication of selected RB sets can refer to the RB sets configured in the RB configuration (e.g., by index or other identifier). In another example, the selected RB set can be indicated using an RB set index value, where one of previously configured RB sets can be selected.

In method 800, optionally at Block 806, an indication of one or more selected RB sets out of multiple configured RB sets can be transmitted to the downstream IAB node. In an aspect, configuring component 742, e.g., in conjunction with processor(s) 712, memory 716, transceiver 702, scheduling component 246, etc., can transmit, to the downstream IAB node (e.g., IAB node 204), the indication of one or more selected RB sets out of multiple RB sets. For example, configuring component 742 can transmit the indication of the one or more selected RB sets as part of the configuration transmitted at Block 802, as part of the DCI transmitted at Block 804, in a media access control (MAC)-control element (CE), in another DCI, in additional control signaling to the IAB node 204, etc.

In method 900, optionally at Block 910, an indication of one or more selected RB sets out of multiple configured RB sets can be received from the upstream node. In an aspect, configuration component 642, e.g., in conjunction with processor(s) 612, memory 616, transceiver 602, communicating component 242, etc., can receive, from the upstream node (e.g., upstream node 202), the indication of the one or more selected RB sets out of multiple configured RB sets. For example, configuration component 642 can receive the indication of the one or more selected RB sets as part of the configuration received at Block 902, as part of the DCI received at Block 904, in a media access control (MAC)-control element (CE), in another DCI, in additional control signaling from the upstream node 202, etc.

For example, the indication can be signaled as a MAC-CE to indicate one or more selected or otherwise applicable RB sets per serving cell. In this example, configuration component 642 can determine the selected RB sets based on receiving the indication in the MAC-CE. In another example, the configuration transmitted at Block 802, or received at Block 902, can be extended to indicate the selected RB sets. In a specific example, the AvailabilityCombinationsPerCell table can be extended so each row is associated with one or more selected or otherwise applicable RB sets. In this example, the existing DCI 2_5 can be used to indicate the one resource availability combination for a given cell, and the indicated resource availability combination can be associated with the one or more selected RB sets in the RRC-configured AvailabilityCombinationsPerCell table. For example, one code point in DCI 2_5 that points to an AvailabilityCombinationId of the AvailabilityCombinationsPerCell table can select both availability pattern in time-domain and the associated applicable RB sets for a serving cell. For example, the availability combination may have a format similar to the following:

```
AvailabilityCombination-r17 ::=    SEQUENCE {
    availabilityCombinationId-r16      AvailabilityCombinationId-r16,
    selectedRBSets                     bitmap,
    resourceAvailability-r16           SEQUENCE (SIZE
(1..maxNrofResourceAvailabilityPerCombination-r16)) OF INTEGER
(0..7)
}
```

The number of availability combinations in the table may be extended (e.g., beyond 512) to allow for indicating multiple selected RB sets for different combinations. An example is shown in FIG. 10.

Figure 10:
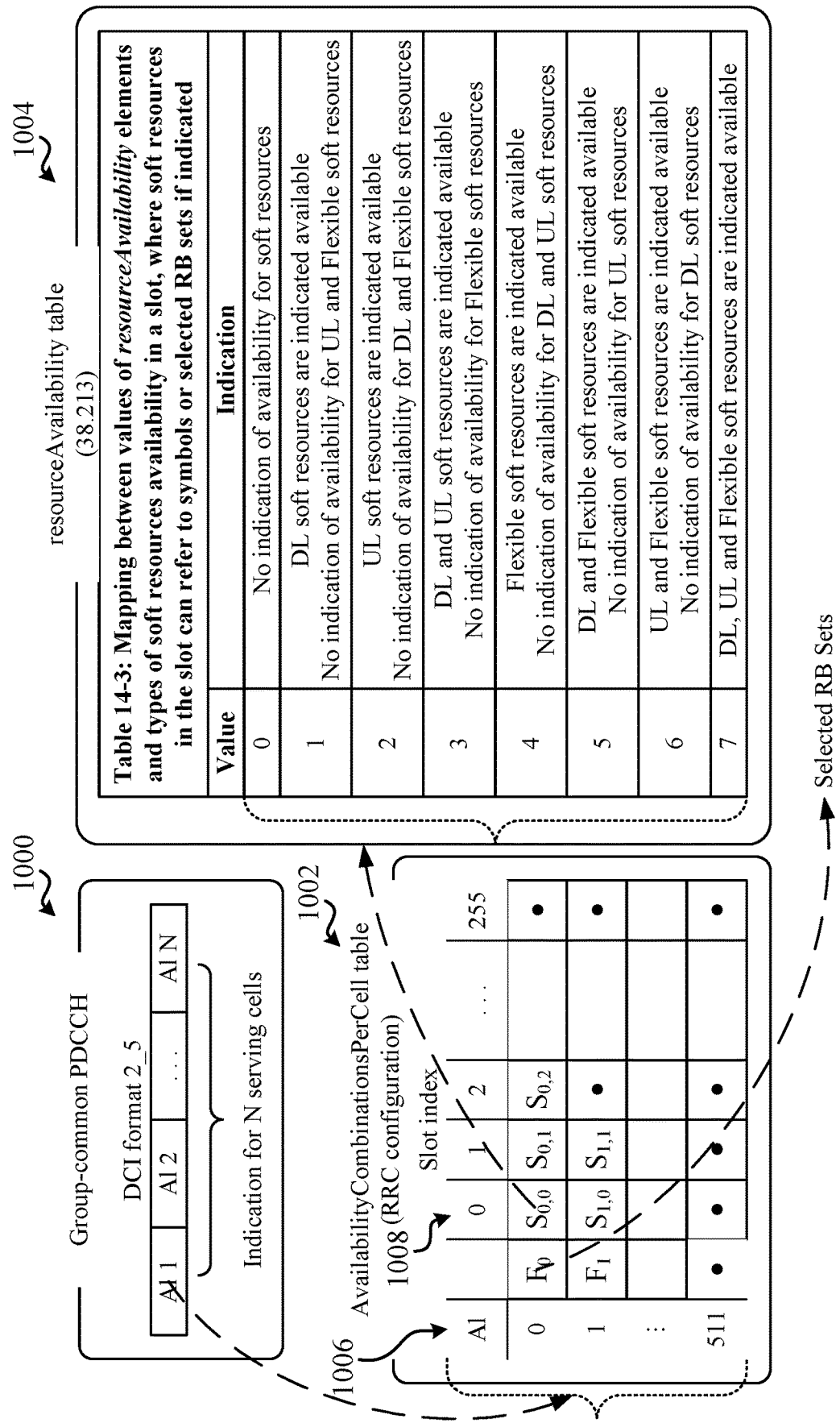
FIG. 10 illustrates various configurations and downlink control information (DCI) indications, in accordance with various aspects of the present disclosure.

FIG. 10 illustrates various configurations and DCI indications described herein, including group-common PDCCH 1000, AvailabilityCombinationsPerCell table 1002, and resourceAvailability table 1004. In this example, AvailabilityCombinationsPerCell table 1002 can be extended with a new column 1006 to indicate the one or more selected RB sets to which the availability combination row (e.g., each availability indication (AI)) applies, along with the per slot values 1008 indicating the soft symbol availability status from resourceAvailability table 1004.

In another specific example, the AvailabilityCombinationsPerCell table can be extended so each row/column element can also indicate one or more selected or otherwise applicable RB sets (e.g., in addition to the value that maps to the resourceAvailability table. In this example, existing DCI 2_5 can be maintained and RRC-configured AvailabilityCombinationsPerCell table can be extended such that the resourceAvailability element for each slot includes two indications: one being the existing 3-bit indication for selection of DL/UL/Flexible symbols, and another being an indication for selected RB sets for this slot. For example, the availability combination received in RRC signaling may have a format similar to one or more of the following:

```
AvailabilityCombination-r17 ::=    SEQUENCE {
    availabilityCombinationId-r16      AvailabilityCombinationId-r16,
    resourceAvailability-r16           SEQUENCE (SIZE
(1..maxNrofResourceAvailabilityPerCombination-r16)) OF (INTEGER
(0..7), SelectedRBSets)
}
AvailabilityCombination-r17 ::=    SEQUENCE {
    availabilityCombinationId-r16      AvailabilityCombinationId-r16,
    resourceAvailability-r16           SEQUENCE (SIZE
(1..maxNrofResourceAvailabilityPerCombination-r16)) OF INTEGER
(0..7)
    resourceAvailability2-r17          SEQUENCE (same SIZE as
(resourceAvailability-r16)) OF SelectedRBSets
}
``` where SelectedRBSets can be a N-bit map for selection out of N RB sets.

Figure 11:
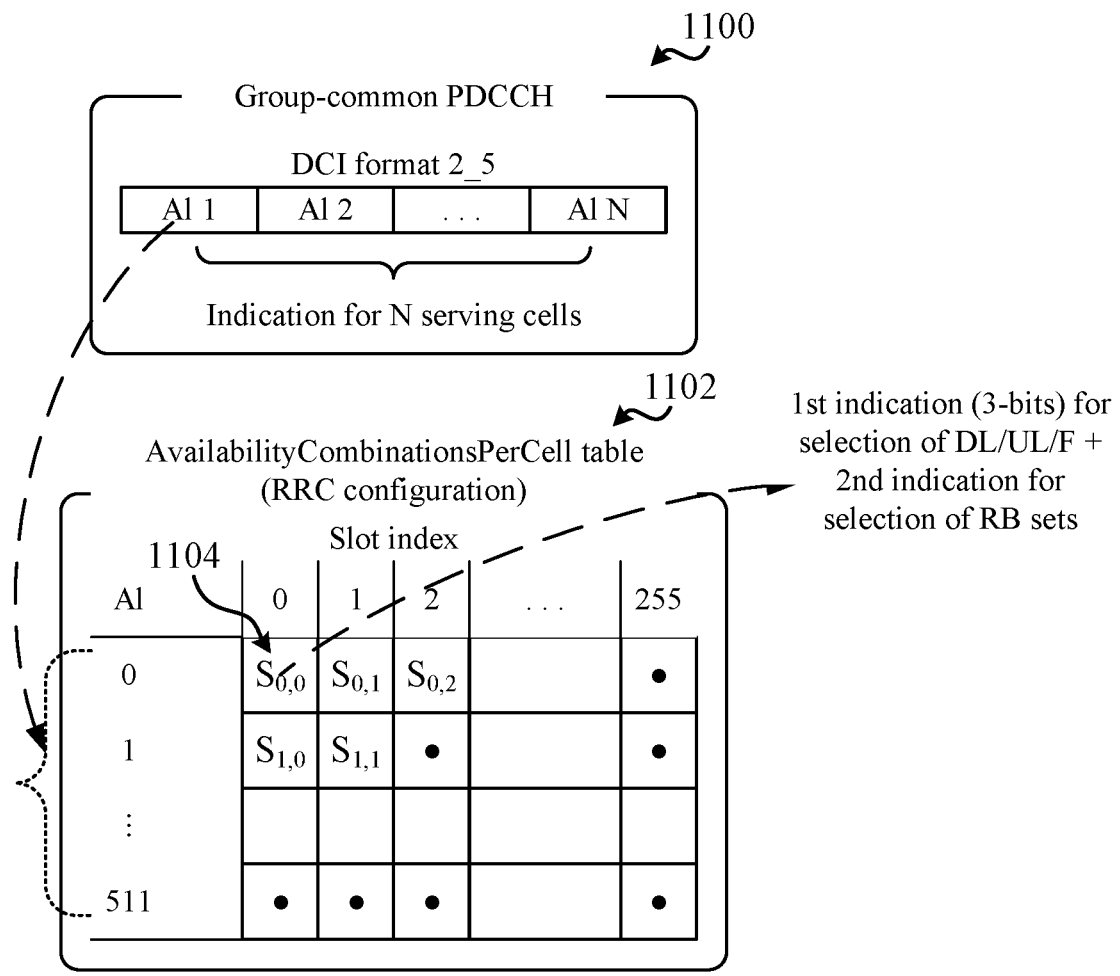
FIG. 11 illustrates various configurations and downlink control information (DCI) indications for resource availability, in accordance with various aspects of the present disclosure.

FIG. 11 illustrates various configurations and DCI indications described herein, including group-common PDCCH 1100, and AvailabilityCombinationsPerCell table 1102. In this example, AvailabilityCombinationsPerCell table 1102 can be extended where each resourceAvailability value in the table 1102, such as resourceAvailability value 1104, includes a first indication (e.g., a first number of bits, such as 3 bits) that indicates selection of DL/U/Flexible symbols, and a second indication (e.g., a second number of bits) that indicate selection of RB sets, as described in the above example.

In another example, the DCI transmitted at Block 804, or received at Block 904, can be extended to indicate the selected RB sets. For example, DCI 2_5 can be extended with additional new fields to indicate one or more applicable RB sets. In one example, for each serving cell, the DCI can include the availability indicator and an indicator of a selected RB sets (e.g., index of applicable RB set). In this example, one applicable RB set is indicated. In another example, for each serving cell, the DCI can include the availability indicator and a bitmap of selected RB sets. In this format, multiple RB sets with bit=1 can be applicable. In addition, for example, a maximum number of availability indicators in the DCI can be extended (e.g., beyond 128) to allow for configuring various RB sets per availability indicator for the one or more cells of the IAB node.

In yet another example, a new DCI format can be used or defined to indicate one or more applicable RB sets per serving cell. In this example, the indication transmitted at Block 906, or received at Block 910, can include the new DCI format, which can indicate the index of selected RB set or bitmap of one or more selected RB sets.

In any case, based on receiving the indication of the selected RB sets, whether by extended RRC configuration, extended DCI, or new MAC-CE or DCI, configuration component 642 can determine whether RB sets indicated as soft ("S") for a given set of one or more symbols can be used based on determining whether the RB sets are selected RB sets, and/or whether the selected RB sets are indicated as available by the other configuration (e.g., the RRC configuration) and/or DCI selection, as described herein, for the one resource availability combination. MT unit 318 can accordingly communicate with one or more upstream nodes, or DU unit 320 can accordingly communicate with one or more downstream nodes, over selected RB sets indicated as available.

In another example, the configuration transmitted at Block 802, or received at Block 902, can have each item in each resource availability combination indicating a resource availability per RB set of multiple configured RB sets of one slot. For example, separate availability indications can be applied for different RB sets for a symbol type (downlink, uplink, flexible) of a slot. This can be used where time-domain resource patterns of H/SNA are configured per RB set in frequency domain. In one example, existing DCI 2_5 can be maintained, and the RRC-configured resourceAvailability table (e.g., transmitted at Block 802 or received at Block 902) can be extended so that the values can indicate not just the range of 0 . . . 7, but also value per given RB set. For example, for L RB sets, the resourceAvailability table can include values of the range $0 \ldots 2^{3*L}-1$ values. In this regard, the AvailabilityCombinationPerCell table can be extended to accept the larger range of values, and each value can represent not only the indication from the resourceAvailability table above, but this value for one or more RB sets. For example, the availability combination may have a format similar to the following:

```
AvailabilityCombination-r17 ::=     SEQUENCE {
    availabilityCombinationId-r16       AvailabilityCombinationId-r16,
    resourceAvailability-r16            SEQUENCE (SIZE
(1..maxNrofResourceAvailabilityPerCombination-r16)) OF INTEGER
(0..2^{3*L} -1)
```

In another example, existing DCI 2_5 can be maintained and RRC-configured AvailabilityCombinationsPerCell table (e.g., transmitted at Block 802 or received at Block 902) can be extended such that each row in the table can indicate various (RB set i, slot j). In an example, the arrangement of RBsets and slots in each row can be indicated in the wireless communication technology specification such that the IAB node 204 can be configured with the arrangement in memory 216. In an example, each row in AvailabilityCombinations can be arranged in RBset first then slot as: (RBset1_slot1, RBset2_slot1, . . . , RBsetM_slot1, RBset1_slot2, . . . RBsetM, _slot2 . . . RBset1_slotN, . . . RBsetM_slotN). In another example, each row in AvailabilityCombinations is arranged in slot first then RBset as: (slot1_RBset1, slot2_RBset1, . . . slotN_RBset1, slot2_RBset2, . . . slotN_RBset2, . . . Slot1_RBsetM, . . . SlotN_RBsetM). In an example, the maximum number of resource availability combinations can be extended (e.g., beyond 256) to account for the additional combinations per RB set.

In yet another example, DCI 2_5 (e.g., transmitted at Block 804 or received at Block 904) can be extended from indication per cell to indication per RB set per cell, and RRC-configured AvailabilityCombinationsPerCell (e.g., transmitted at Block 802 or received at Block 902) can be extended such that different subsets of rows in AvailabilityCombinations are associated with different RB sets of the serving cell. For example, DCI 2_5 can indicate availability indication and RBSet1_cell1, availability indication and RBSet2_cell1, . . . availability indication and RBSetM_cell1, availability indication and RBSet1_cell2, . . . AI RBSetM_cell2, . . . . In another example, in AvailabilityCombinations, rows 1:L1 can be associated with RBSet1; rows L1+1:L2 can be associated with RBset2, . . . . In these examples, the maximum availability indication DCI payload size can be extended (e.g., beyond 128) to allow for the additional availability indications per RB set. In addition, for example, the maximum number of availability combinations can be extended (e.g., beyond 512) to accommodate the additional range of values.

In yet another example, DCI 2_5 (e.g., transmitted at Block 804 or received at Block 904) can be extended from indication per cell to indication per RB set per cell, and AvailabilityCombinationsPerCell (e.g., transmitted at Block 802 or received at Block 902) can be extended from per cell to per RB set of per cell or introduce a new parameter. For example, a new parameter AvailabilityCombinationsPerRB-SetPerCell can be introduced or AvailabilityCombinations-PerCell can be redefined as per RBSet per cell, where a new field "RBset identity" can added. In this example, the maximum availability indication DCI payload size can be increased (e.g., beyond 128) to account for the larger number of combinations indicated in the DCI.

In yet another example, multiple DCIs may be configured, each one associated with one or more RB sets per serving cell, and/or each one configured with its own RNTI and/or search space. In an example, in method 800, optionally at Block 808, a second DCI indicating one or more other RB sets per serving cell can be transmitted to the downstream IAB node. In an aspect, configuring component 742, e.g., in conjunction with processor(s) 712, memory 716, transceiver 702, scheduling component 246, etc., can transmit, to the downstream IAB node (e.g., IAB node 204), the second DCI indicating one or more other RB sets per serving cell. For example, configuring component 742 can transmit the DCI at Block 804 and also the second DCI at Block 808 (or one or more other DCIs), where each DCI can correspond to one or more RB sets.

In method 900, optionally at Block 912, a second DCI indicating one or more other RB sets per serving cell can be received from the upstream node. In an aspect, configuration component 642, e.g., in conjunction with processor(s) 612, memory 616, transceiver 602, communicating component 242, etc., can receive, from the upstream node (e.g., upstream node 202), the second DCI indicating one or more other RB sets per serving cell. For example, configuration component 642 can receive the DCI at Block 904 and the second DCI at Block 912 (or one or more other DCIs), where each DCI can correspond to one or more RB sets. Thus, for example, configuration component 642 can determine, from the DCI associated with a given RB set, the one resource availability combination indicated for that RB set.

In any case, based on the determined RB set and configuration or DCI(s), which may be extended as described above, configuration component 642 can determine the one resource availability combination associated with the RB set. In an example, configuration component 642 can determine whether RB set(s) indicated as soft ("S") can be used based on determining the resource availability combination indicated for the RB set(s) indicate that the RB set(s) are available by the other configuration (e.g., the RRC configuration) and/or DCI selection, as described herein, for the one resource availability combination. MT unit 318 can accordingly communicate with one or more upstream nodes, or DU unit 320 can accordingly communicate with one or more downstream nodes, over RB set(s) indicated as available.

In yet another example, the number of slots indicated in the AvailabilityCombinationsPerCell table may not be equal to or larger than a PDCCH monitoring periodicity for DCI format 2_5 as provided by a defined SearchSpace. This can allow the number of slots smaller than a PDCCH monitoring periodicity for DCI format 2_5, and can allow for defining default behavior for unindicated slots, e.g. using implicit determination. The resource availability indication per combination can be only over the slots that contain soft symbols. The slots without soft symbols can be skipped in configuration of resourceAvailability table.

Figure 12:
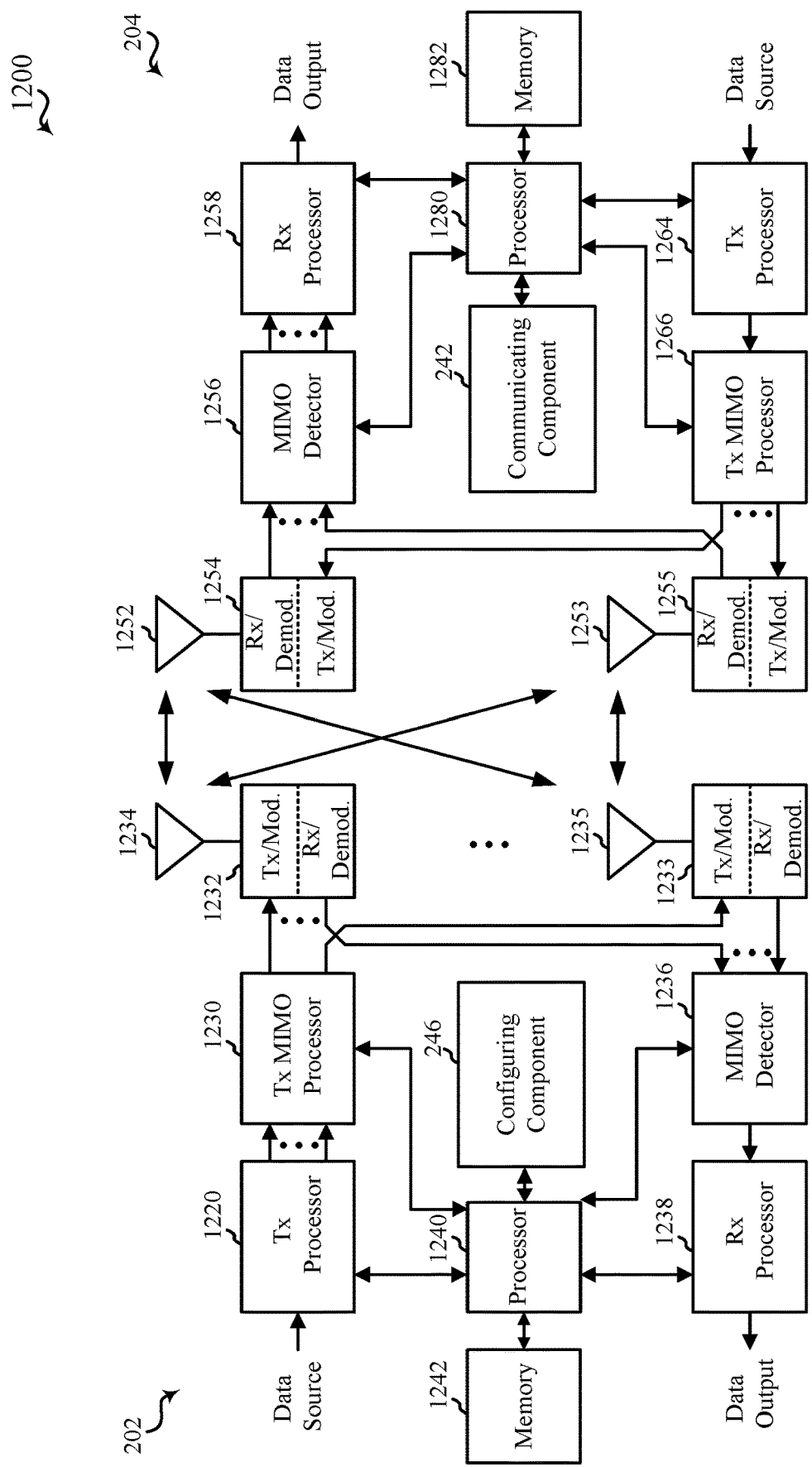
FIG. 12 is a block diagram illustrating an example of a multiple-input multiple-output (MIMO) communication system including a upstream node and IAB node, in accordance with various aspects of the present disclosure.

FIG. 12 is a block diagram of a MIMO communication system 1200 including an upstream node 202 and a IAB node 204 (or a MT unit thereof, a UE, or other downstream node). The MIMO communication system 1200 may illustrate aspects of the wireless communication access network 100 described with reference to FIG. 1. The upstream node 202 may be an example of aspects of the upstream node 202 described with reference to FIGS. 2-5. The upstream node 202 may be equipped with antennas 1234 and 1235, and the IAB node 204 may be equipped with antennas 1252 and 1253. In the MIMO communication system 1200, the upstream node 202 may be able to send data over multiple communication links at the same time. Each communication link may be called a "layer" and the "rank" of the communication link may indicate the number of layers used for communication. For example, in a 2×2 MIMO communication system where upstream node 202 transmits two "layers," the rank of the communication link between the upstream node 202 and the IAB node 204 is two.

At the upstream node 202, a transmit (Tx) processor 1220 may receive data from a data source. The transmit processor 1220 may process the data. The transmit processor 1220 may also generate control symbols or reference symbols. A transmit MIMO processor 1230 may perform spatial processing (e.g., precoding) on data symbols, control symbols, or reference symbols, if applicable, and may provide output symbol streams to the transmit modulator/demodulators 1232 and 1233. Each modulator/demodulator 1232 through 1233 may process a respective output symbol stream (e.g., for OFDM, etc.) to obtain an output sample stream. Each modulator/demodulator 1232 through 1233 may further process (e.g., convert to analog, amplify, filter, and upconvert) the output sample stream to obtain a DL signal. In one example, DL signals from modulator/demodulators 1232 and 1233 may be transmitted via the antennas 1234 and 1235, respectively.

The IAB node 204 may be an example of aspects of the IAB nodes 204 described with reference to FIGS. 1-3, etc. At the IAB node 204, the antennas 1252 and 1253 may receive the DL signals from the upstream node 202 and may provide the received signals to the modulator/demodulators 1254 and 1255, respectively. Each modulator/demodulator 1254 through 1255 may condition (e.g., filter, amplify, downconvert, and digitize) a respective received signal to obtain input samples. Each modulator/demodulator 1254 through 1255 may further process the input samples (e.g., for OFDM, etc.) to obtain received symbols. A MIMO detector 1256 may obtain received symbols from the modulator/demodulators 1254 and 1255, perform MIMO detection on the received symbols, if applicable, and provide detected symbols. A receive (Rx) processor 1258 may process (e.g., demodulate, deinterleave, and decode) the detected symbols, providing decoded data for the IAB node 204 to a data output, and provide decoded control information to a processor 1280, or memory 1282.

The processor 1280 may in some cases execute stored instructions to instantiate a communicating component 242 (see e.g., FIGS. 2 and 6) for providing a IAB node function.

On the uplink (UL), at the IAB node 204, a transmit processor 1264 may receive and process data from a data source. The transmit processor 1264 may also generate reference symbols for a reference signal. The symbols from the transmit processor 1264 may be precoded by a transmit MIMO processor 1266 if applicable, further processed by the modulator/demodulators 1254 and 1255 (e.g., for SC-FDMA, etc.), and be transmitted to the upstream node 202 in accordance with the communication parameters received from the upstream node 202. At the upstream node 202, the UL signals from the IAB node 204 may be received by the antennas 1234 and 1235, processed by the modulator/demodulators 1232 and 1233, detected by a MIMO detector 1236 if applicable, and further processed by a receive processor 1238. The receive processor 1238 may provide decoded data to a data output and to the processor 1240 or memory 1242.

The processor 1240 may in some cases execute stored instructions to instantiate a scheduling component 246 (see e.g., FIGS. 2 and 7) for configuring a IAB node to provide a IAB node function.

The components of the IAB node 204 may, individually or collectively, be implemented with one or more ASICs adapted to perform some or all of the applicable functions in hardware. Each of the noted modules may be a means for performing one or more functions related to operation of the MIMO communication system 1200. Similarly, the components of the upstream node 202 may, individually or collectively, be implemented with one or more ASICs adapted to perform some or all of the applicable functions in hardware. Each of the noted components may be a means for performing one or more functions related to operation of the MIMO communication system 1200.

The following aspects are illustrative only and aspects thereof may be combined with aspects of other embodiments or teaching described herein, without limitation.

Aspect 1 is a method for wireless communication at an IAB node including receiving, at the IAB node and from an upstream node, a configuration for each cell of the IAB node indicating multiple resource availability combinations with each resource availability combination over multiple slots, where each item in each resource availability combination indicates a resource availability for multiple configured RB sets in one slot, receiving, at the IAB node and from an upstream node, a DCI indicating one resource availability combination of the multiple resource availability combinations for one or more cells of the IAB node, and communicating, by the one or more cells of the IAB node and in the one slot, over one or more RB sets of the multiple configured RB sets in symbols indicated as available by the one resource availability combination.

In Aspect 2, the method of Aspect 1 includes where the resource availability indicated by a given item of the one resource availability combination for the one slot corresponds to all RB sets associated with a soft type being indicated as available at symbols in the one slot.

In Aspect 3, the method of Aspect 2 includes where the given item indicates the one resource availability combination in the one slot as one of no indication of availability for all RB sets associated with the soft type in all of the symbols, indication of availability for all RB sets associated with the soft type in symbols having a symbol type of downlink symbol with no indication of availability for all RB sets in symbols having a symbol type of uplink symbol or flexible symbol, indication of availability for all RB sets associated with the soft type in symbols having a symbol type of uplink symbol with no indication of availability for all RB sets in symbols having a symbol type of downlink symbol or flexible symbol, indication of availability for all RB sets associated with the soft type in symbols having a symbol type of downlink symbol or uplink symbol with no indication of availability for all RB sets in symbols having a symbol type of flexible symbol, indication of availability for all RB sets associated with the soft type in symbols having a symbol type of flexible symbol with no indication of availability for all RB sets in symbols having a symbol type of downlink symbol or uplink symbol, indication of availability for all RB sets associated with the soft type in symbols having a symbol type of downlink symbol or flexible symbol with no indication of availability for all RB sets in symbols having a symbol type of uplink symbol, indication of availability for all RB sets associated with the soft type in symbols having a symbol type of uplink symbol or flexible symbol with no indication of availability for all RB sets in symbols having a symbol type of downlink symbol, or indication of availability for all RB sets associated with the soft type in all of the symbols.

In Aspect 4, the method of any of Aspects 1 to 3 includes where communicating over the one or more RB sets in a given symbol of the slot includes determining that the one or more RB sets are associated with a soft type for the given symbol and determining that the given symbol is of a symbol type indicated as available in the slot based on the one resource availability combination.

In Aspect 5, the method of Aspect 4 includes where the symbol type is one of a downlink symbol, an uplink symbol, or a flexible symbol.

In Aspect 6, the method of any of Aspects 1 to 5 includes where the configuration indicates the resource availability for only a subset of the multiple slots that include symbols having RB sets associated with a soft type.

Aspect 7 is a method for wireless communication at a node including
    transmitting, by the node and to a downstream IAB node, a configuration for each cell of the downstream IAB node indicating multiple resource availability combinations with each resource availability combination over multiple slots, where each item in each resource availability combination indicates a resource availability for multiple configured RB sets in one slot, and transmitting, by the node and to the downstream IAB node, a DCI indicating one resource availability combination of the multiple resource availability combinations for one or more cells of the downstream IAB node.

In Aspect 8, the method of Aspect 7 includes where the resource availability indicated by a given item of the one resource availability combination for the one slot corresponds to all RB sets associated with a soft type being indicated as available at symbols in the one slot.

In Aspect 9, the method of Aspect 8 includes where the given item indicates the one resource availability combination in the one slot as one of no indication of availability for all RB sets associated with the soft type in all of the symbols, indication of availability for all RB sets associated with the soft type in symbols having a symbol type of downlink symbol with no indication of availability for all RB sets in symbols having a symbol type of uplink symbol or flexible symbol, indication of availability for all RB sets associated with the soft type in symbols having a symbol type of uplink symbol with no indication of availability for all RB sets in symbols having a symbol type of downlink symbol or flexible symbol, indication of availability for all RB sets associated with the soft type in symbols having a symbol type of downlink symbol or uplink symbol with no indication of availability for all RB sets in symbols having a symbol type of flexible symbol, indication of availability for all RB sets associated with the soft type in symbols having a symbol type of flexible symbol with no indication of availability for all RB sets in symbols having a symbol type of downlink symbol or uplink symbol, indication of availability for all RB sets associated with the soft type in symbols having a symbol type of downlink symbol or flexible symbol with no indication of availability for all RB sets in symbols having a symbol type of uplink symbol, indication of availability for all RB sets associated with the soft type in symbols having a symbol type of uplink symbol or flexible symbol with no indication of availability for all RB sets in symbols having a symbol type of downlink symbol, or indication of availability for all RB sets associated with the soft type in all of the symbols.

In Aspect 10, the method of any of Aspects 7 to 9 includes where the configuration indicates the resource availability for only a subset of the multiple slots that include symbols having RB sets associated with a soft type.

Aspect 11 is a method for wireless communication at an IAB node including receiving, at the IAB node and from an upstream node, a configuration for each cell of the IAB node indicating multiple resource availability combinations with each resource availability combination over multiple slots, where each item in each resource availability combination indicates a resource availability for multiple configured RB sets in one slot, receiving, at the IAB node and from the upstream node, an indication of one or more selected RB sets out of the multiple configured RB sets, receiving, at the IAB node and from the upstream node, a DCI indicating one resource availability combination of the multiple resource availability combinations for one or more cells of the IAB node, and communicating, by the one or more cells of the IAB node and in the one slot, over the one or more selected RB sets in symbols indicated as available by the one resource availability combination.

In Aspect 12, the method of Aspect 11 includes where the resource availability indicated by a given item of the one resource availability combination for the one slot corresponds to the one or more selected RB sets at symbols in the one slot.

In Aspect 13, the method of Aspect 12 includes where the given item indicates the one resource availability combination in the one slot as one of no indication of availability per RB set associated with a soft type in all of the symbols, indication of availability per RB set associated with a soft type in symbols having a symbol type of downlink symbol with no indication of availability per RB set in symbols having a symbol type of uplink symbol or flexible symbol, indication of availability per RB set associated with a soft type in symbols having a symbol type of uplink symbol with no indication of availability per RB set in symbols having a symbol type of downlink symbol or flexible symbol, indication of availability per RB set associated with a soft type in symbols having a symbol type of downlink symbol or uplink symbol with no indication of availability per RB set in symbols having a symbol type of flexible symbol, indication of availability per RB set associated with a soft type in symbols having a symbol type of flexible symbol with no indication of availability per RB set in symbols having a symbol type of downlink symbol or uplink symbol, indication of availability per RB set associated with a soft type in symbols having a symbol type of downlink symbol or flexible symbol with no indication of availability per RB set in symbols having a symbol type of uplink symbol, indication of availability per RB set associated with a soft type in symbols having a symbol type of uplink symbol or flexible symbol with no indication of availability per RB set in symbols having a symbol type of downlink symbol, or indication of availability per RB set associated with a soft type in all of the symbols.

In Aspect 14, the method of any of Aspects 11 to 13 includes where the indication of the one or more selected RB sets includes a bitmap for each symbol, where each bit in the bitmap indicates selection of one RB set of the multiple configured RB sets.

In Aspect 15, the method of any of Aspects 11 to 13 includes where the indication of the one or more selected RB sets includes one or more indices of RB sets corresponding to the one or more selected RB sets.

In Aspect 16, the method of any of Aspects 11 to 15 includes where receiving the indication includes receiving, from the upstream node, a MAC-CE including the indication of the one or more selected RB sets of the multiple configured RB sets for each cell of the IAB node.

In Aspect 17, the method of any of Aspects 11 to 15 includes where the indication of one or more selected RB sets is received in the configuration.

In Aspect 18, the method of any of Aspects 11 to 15 includes where the configuration indicates, for each respective slot in each respective resource availability combination of the multiple resource availability combinations, the one or more selected RB sets of the multiple configured RB sets that correspond to the respective slot.

In Aspect 19, the method of any of Aspects 11 to 15 includes where the DCI indicates the one or more selected RB sets to which the one resource availability combination applies for the one or more cells of the IAB node.

In Aspect 20, the method of Aspect 19 includes where the DCI indicates the one or more selected RB sets as one of an index of an applicable RB set or a bitmap indicating the one or more selected RB sets out of the multiple configured RB sets.

In Aspect 21, the method of any of Aspects 11 to 15 includes where receiving the indication includes receiving, from the upstream node, the indication as a second DCI that indicates the one or more selected RB sets to which the one resource availability combination applies for the one or more cells of the IAB node.

In Aspect 22, the method of Aspect 21 includes where the second DCI indicates the one or more selected RB sets as one of an index of an applicable RB set or a bitmap indicating the one or more selected RB sets out of the multiple configured RB sets.

In Aspect 23, the method of any of Aspects 11 to 22 includes where the configuration indicates the resource availability for only a subset of the multiple slots that include symbols having RB sets associated with a soft type.

Aspect 24 is a method for wireless communication at a node including transmitting, by the node and to a downstream IAB node, a configuration for each cell of the downstream IAB node indicating multiple resource availability combinations with each resource availability combination over multiple slots, where each item in each resource availability combination indicates a resource availability for multiple configured RB sets in one slot, transmitting, by the node and to the downstream IAB node, an indication of one or more selected RB sets out of the multiple configured RB sets, and transmitting, by the node and to the downstream IAB node, a DCI indicating one resource availability combination of the multiple resource availability combinations for one or more cells of the downstream IAB node.

In Aspect 25, the method of Aspect 24 includes where the resource availability indicated by a given item of the one resource availability combination for the one slot corresponds to the one or more selected RB sets at symbols in the one slot.

In Aspect 26, the method of Aspect 25 includes where the given item indicates the one resource availability combination in the one slot as one of no indication of availability per RB set associated with a soft type in all of the symbols, indication of availability per RB set associated with a soft type in symbols having a symbol type of downlink symbol with no indication of availability per RB set in symbols having a symbol type of uplink symbol or flexible symbol, indication of availability per RB set associated with a soft type in symbols having a symbol type of uplink symbol with no indication of availability per RB set in symbols having a symbol type of downlink symbol or flexible symbol, indication of availability per RB set associated with a soft type in symbols having a symbol type of downlink symbol or uplink symbol with no indication of availability per RB set in symbols having a symbol type of flexible symbol, indication of availability per RB set associated with a soft type in symbols having a symbol type of flexible symbol with no indication of availability per RB set in symbols having a symbol type of downlink symbol or uplink symbol, indication of availability per RB set associated with a soft type in symbols having a symbol type of downlink symbol or flexible symbol with no indication of availability per RB set in symbols having a symbol type of uplink symbol, indication of availability per RB set associated with a soft type in symbols having a symbol type of uplink symbol or flexible symbol with no indication of availability per RB set in symbols having a symbol type of downlink symbol, or indication of availability per RB set associated with a soft type in all of the symbols.

In Aspect 27, the method of any of Aspects 24 to 26 includes where the indication of the one or more selected RB sets includes a bitmap for each symbol, where each bit in the bitmap indicates selection of one RB set of the multiple configured RB sets.

In Aspect 28, the method of any of Aspects 24 to 26 includes where the indication of the one or more selected RB sets includes one or more indices of RB sets corresponding to the one or more selected RB sets.

In Aspect 29, the method of any of Aspects 24 to 28 includes where transmitting the indication includes transmitting, to the IAB node, a MAC-CE including the indication of the one or more selected RB sets of the multiple configured RB sets for each cell of the IAB node.

In Aspect 30, the method of any of Aspects 24 to 28 includes where the indication of one or more selected RB sets is received in the configuration.

Aspect 31, the method of any of Aspects 24 to 28 includes where the configuration indicates, for each respective slot in each respective resource availability combination of the multiple resource availability combinations, the one or more selected RB sets of the multiple configured RB sets that correspond to the respective slot.

In Aspect 32, the method of any of Aspects 24 to 28 includes where the DCI indicates the one or more selected RB sets to which the one resource availability combination applies for the one or more cells of the IAB node.

In Aspect 33, the method of Aspect 32 includes where the DCI indicates the one or more selected RB sets as one of an index of an applicable RB set or a bitmap indicating the one or more selected RB sets out of the multiple configured RB sets.

In Aspect 34, the method of any of Aspects 24 to 28 includes where transmitting the indication includes transmitting, to the IAB node, the indication as a second DCI that indicates the one or more selected RB sets to which the one resource availability combination applies for the one or more cells of the IAB node.

In Aspect 35, the method of Aspect 34 includes where the second DCI indicates the one or more selected RB sets as one of an index of an applicable RB set or a bitmap indicating the one or more selected RB sets out of the multiple configured RB sets.

In Aspect 36, the method of any of Aspects 24 to 35 includes where the configuration indicates the resource availability for only a subset of the multiple slots that include symbols having RB sets associated with a soft type.

Aspect 37 is a method for wireless communication at an IAB node including receiving, at the IAB node and from an upstream node, a configuration for each cell of the IAB node indicating multiple resource availability combinations with each resource availability combination over multiple slots, where each item in each resource availability combination indicates a resource availability per RB set of multiple configured RB sets of one slot, receiving, at the IAB node and from the upstream node, a DCI indicating one resource availability combination of the multiple resource availability combinations for one or more cells of the IAB node, and communicating, by the one or more cells of the IAB node and in the one slot, over one or more RB sets of the multiple configured RB sets in symbols indicated as available by the one resource availability combination.

In Aspect 38, the method of Aspect 37 includes where the configuration indicates the resource availability as a value, for each slot of the multiple slots, where the value indicates resource availability per RB set of multiple configured RB sets within the configured bandwidth for each of the multiple symbol types.

In Aspect 39, the method of Aspect 37 includes where the configuration indicates the resource availability for multiple combinations of slots of the multiple slots and RB sets of the multiple configured RB sets.

In Aspect 40, the method of Aspect 39 includes where the configuration indicates, for a given item of the one resource availability combination, the resource availability as one of no indication of availability per RB set associated with a soft type in all of the symbols, indication of availability per RB set associated with a soft type in symbols having a symbol type of downlink symbol with no indication of availability per RB set in symbols having a symbol type of uplink symbol or flexible symbol, indication of availability per RB set associated with a soft type in symbols having a symbol type of uplink symbol with no indication of availability per RB set in symbols having a symbol type of downlink symbol or flexible symbol, indication of availability per RB set associated with a soft type in symbols having a symbol type of downlink symbol or uplink symbol with no indication of availability per RB set in symbols having a symbol type of flexible symbol, indication of availability per RB set associated with a soft type in symbols having a symbol type of flexible symbol with no indication of availability per RB set in symbols having a symbol type of downlink symbol or uplink symbol, indication of availability per RB set associated with a soft type in symbols having a symbol type of downlink symbol or flexible symbol with no indication of availability per RB set in symbols having a symbol type of uplink symbol, indication of availability per RB set associated with a soft type in symbols having a symbol type of uplink symbol or flexible symbol with no indication of availability per RB set in symbols having a symbol type of downlink symbol, or indication of availability per RB set associated with a soft type in all of the symbols.

In Aspect 41, the method of Aspect 39 includes where the configuration indicates the resource availability for the multiple combinations in multiple rows of a table, where each row is arranged by RB set and then slot.

In Aspect 42, the method of Aspect 39 includes where the configuration indicates the resource availability for the multiple combinations in multiple rows of a table, where each row is arranged by slot then RB set.

In Aspect 43, the method of Aspect 37 includes where the DCI indicates a set of resource availability combinations each corresponding to a different RB set, and where communicating over the one or more RB sets of the multiple configured RB sets in symbols indicated as available includes determining the resource availability combination, from the set of resource availability combinations, based on the one or more RB sets.

In Aspect 44, the method of Aspect 43 includes where the DCI indicates the set of resource availability combinations each corresponding to a different RB set in different rows of a table.

In Aspect 45, the method of Aspect 43 includes where the DCI indicates the set of resource availability combinations in different tables each corresponding to a different RB set.

In Aspect 46, the method of Aspect 37 includes receiving, from the upstream node, a second DCI that indicates the one or more RB sets to which the one resource availability combination applies for the one or more cells of the IAB node.

In Aspect 47, the method of any of Aspects 37 to 46 includes where the configuration indicates the resource availability for only a subset of the multiple slots that include symbols having RB sets associated with a soft type.

Aspect 48 is a method for wireless communication at a node including transmitting, by the node and to a downstream IAB node, a configuration for each cell of the downstream IAB node indicating multiple resource availability combinations with each resource availability combination over multiple slots, where each item in each resource availability combination indicates a resource availability per RB set of multiple configured RB sets of one slot, and transmitting, by the node and to the downstream IAB node, a DCI indicating one resource availability combination of the multiple resource availability combinations for one or more cells of the downstream IAB node.

In Aspect 49, the method of Aspect 48 includes where the configuration indicates the resource availability as a value, for each slot of the multiple slots, where the value indicates resource availability per RB set of multiple configured RB sets within the configured bandwidth for each of the multiple symbol types.

In Aspect 50, the method of Aspect 48 includes where the configuration indicates the resource availability for multiple combinations of slots of the multiple slots and RB sets of the multiple configured RB sets.

In Aspect 51, the method of Aspect 50 includes where the configuration indicates, for a given item of the one resource availability combination, the resource availability as one of no indication of availability per RB set associated with a soft type in all of the symbols, indication of availability per RB set associated with a soft type in symbols having a symbol type of downlink symbol with no indication of availability per RB set in symbols having a symbol type of uplink symbol or flexible symbol, indication of availability per RB set associated with a soft type in symbols having a symbol type of uplink symbol with no indication of availability per RB set in symbols having a symbol type of downlink symbol or flexible symbol, indication of availability per RB set associated with a soft type in symbols having a symbol type of downlink symbol or uplink symbol with no indication of availability per RB set in symbols having a symbol type of flexible symbol, indication of availability per RB set associated with a soft type in symbols having a symbol type of flexible symbol with no indication of availability per RB set in symbols having a symbol type of downlink symbol or uplink symbol, indication of availability per RB set associated with a soft type in symbols having a symbol type of downlink symbol or flexible symbol with no indication of availability per RB set in symbols having a symbol type of uplink symbol, indication of availability per RB set associated with a soft type in symbols having a symbol type of uplink symbol or flexible symbol with no indication of availability per RB set in symbols having a symbol type of downlink symbol, or indication of availability per RB set associated with a soft type in all of the symbols.

In Aspect 52, the method of Aspect 50 includes where the configuration indicates the resource availability for the multiple combinations in multiple rows of a table, where each row is arranged by RB set and then slot.

In Aspect 53, the method of Aspect 50 includes where the configuration indicates the resource availability for the multiple combinations in multiple rows of a table, where each row is arranged by slot then RB set.

In Aspect 54, the method of Aspect 48 includes where the DCI indicates a set of resource availability combinations each corresponding to a different RB set.

In Aspect 55, the method of Aspect 54 includes where the DCI indicates the set of resource availability combinations each corresponding to a different RB set in different rows of a table.

In Aspect 56, the method of Aspect 54 includes where the DCI indicates the set of resource availability combinations in different tables each corresponding to a different RB set.

In Aspect 57, the method of Aspect 48 includes transmitting, to the downstream IAB node, a second DCI that indicates the one or more RB sets to which the one resource availability combination applies for the one or more cells of the downstream IAB node.

In Aspect 58, the method of any of Aspects 48 to 57 includes where the configuration indicates the resource availability for only a subset of the multiple slots that include symbols having RB sets associated with a soft type.

Aspect 59 is an IAB node for wireless communication including a transceiver, a memory configured to store instructions, and one or more processors communicatively coupled with the memory and the transceiver, where the one or more processors are configured to receive, from an upstream node, a configuration for each cell of the IAB node indicating multiple resource availability combinations with each resource availability combination over multiple slots, where each item in each resource availability combination indicates a resource availability for multiple configured RB sets in one slot, receive, from the upstream node, a DCI indicating one resource availability combination of the multiple resource availability combinations for one or more cells of the IAB node, and communicate, by the one or more cells of the IAB node and in the one slot, over one or more RB sets of the multiple configured RB sets in symbols indicated as available by the one resource availability combination.

In Aspect 60, the IAB node of Aspect 59 includes where the resource availability indicated by a given item of the one resource availability combination for the one slot corresponds to all RB sets associated with a soft type being indicated as available at symbols in the one slot.

In Aspect 61, the IAB node of Aspect 60 includes where the given item indicates the one resource availability combination in the one slot as one of no indication of availability for all RB sets associated with the soft type in all of the symbols, indication of availability for all RB sets associated with the soft type in symbols having a symbol type of downlink symbol with no indication of availability for all RB sets in symbols having a symbol type of uplink symbol or flexible symbol, indication of availability for all RB sets associated with the soft type in symbols having a symbol type of uplink symbol with no indication of availability for all RB sets in symbols having a symbol type of downlink symbol or flexible symbol, indication of availability for all RB sets associated with the soft type in symbols having a symbol type of downlink symbol or uplink symbol with no indication of availability for all RB sets in symbols having a symbol type of flexible symbol, indication of availability for all RB sets associated with the soft type in symbols having a symbol type of flexible symbol with no indication of availability for all RB sets in symbols having a symbol type of downlink symbol or uplink symbol, indication of availability for all RB sets associated with the soft type in symbols having a symbol type of downlink symbol or flexible symbol with no indication of availability for all RB sets in symbols having a symbol type of uplink symbol, indication of availability for all RB sets associated with the soft type in symbols having a symbol type of uplink symbol or flexible symbol with no indication of availability for all RB sets in symbols having a symbol type of downlink symbol, or indication of availability for all RB sets associated with the soft type in all of the symbols.

In Aspect 62, the IAB node of any of Aspects 59 to 61 includes where the one or more processors are configured to communicate over the one or more RB sets in a given symbol of the slot based on determining that the one or more RB sets are associated with a soft type for the given symbol and determining that the given symbol is of a symbol type indicated as available in the slot based on the one resource availability combination.

In Aspect 63, the IAB node of Aspect 62 includes where the symbol type is one of a downlink symbol, an uplink symbol, or a flexible symbol.

In Aspect 64, the IAB node of any of Aspects 59 to 63 includes where the configuration indicates the resource availability for only a subset of the multiple slots that include symbols having RB sets associated with a soft type.

Aspect is a node for wireless communication including a transceiver, a memory configured to store instructions, and one or more processors communicatively coupled with the memory and the transceiver, where the one or more processors are configured to transmit, to a downstream IAB node, a configuration for each cell of the downstream IAB node indicating multiple resource availability combinations with each resource availability combination over multiple slots, where each item in each resource availability combination indicates a resource availability for multiple configured RB sets in one slot, and transmit, to the downstream IAB node, a DCI indicating one resource availability combination of the multiple resource availability combinations for one or more cells of the downstream IAB node.

In Aspect 66, the node of Aspect 65 includes where the resource availability indicated by a given item of the one resource availability combination for the one slot corresponds to all RB sets associated with a soft type being indicated as available at symbols in the one slot.

In Aspect 67, the node of Aspect 66 includes where the given item indicates the one resource availability combination in the one slot as one of no indication of availability for all RB sets associated with the soft type in all of the symbols, indication of availability for all RB sets associated with the soft type in symbols having a symbol type of downlink symbol with no indication of availability for all RB sets in symbols having a symbol type of uplink symbol or flexible symbol, indication of availability for all RB sets associated with the soft type in symbols having a symbol type of uplink symbol with no indication of availability for all RB sets in symbols having a symbol type of downlink symbol or flexible symbol, indication of availability for all RB sets associated with the soft type in symbols having a symbol type of downlink symbol or uplink symbol with no indication of availability for all RB sets in symbols having a symbol type of flexible symbol, indication of availability for all RB sets associated with the soft type in symbols having a symbol type of flexible symbol with no indication of availability for all RB sets in symbols having a symbol type of downlink symbol or uplink symbol, indication of availability for all RB sets associated with the soft type in symbols having a symbol type of downlink symbol or flexible symbol with no indication of availability for all RB sets in symbols having a symbol type of uplink symbol, indication of availability for all RB sets associated with the soft type in symbols having a symbol type of uplink symbol or flexible symbol with no indication of availability for all RB sets in symbols having a symbol type of downlink symbol, or indication of availability for all RB sets associated with the soft type in all of the symbols.

In Aspect 68, the node of any of Aspects 65 to 67 includes where the configuration indicates the resource availability for only a subset of the multiple slots that include symbols having RB sets associated with a soft type.

Aspect 69 is an IAB node for wireless communication including a transceiver, a memory configured to store instructions, and one or more processors communicatively coupled with the memory and the transceiver, where the one or more processors are configured to receive, from an upstream node, a configuration for each cell of the IAB node indicating multiple resource availability combinations with each resource availability combination over multiple slots, where each item in each resource availability combination indicates a resource availability for multiple configured RB sets in one slot, receive, from the upstream node, an indication of one or more selected RB sets out of the multiple configured RB sets, receive, from the upstream node, a DCI indicating one resource availability combination of the multiple resource availability combinations for one or more cells of the IAB node, and communicate, by the one or more cells of the IAB node and in the one slot, over the one or more selected RB sets in symbols indicated as available by the one resource availability combination.

In Aspect 70, the IAB node of Aspect 69 includes where the resource availability indicated by a given item of the one resource availability combination for the one slot corresponds to the one or more selected RB sets at symbols in the one slot.

In Aspect 71, the IAB node of Aspect 70 includes where the given item indicates the one resource availability combination in the one slot as one of no indication of availability per RB set associated with a soft type in all of the symbols, indication of availability per RB set associated with a soft type in symbols having a symbol type of downlink symbol with no indication of availability per RB set in symbols having a symbol type of uplink symbol or flexible symbol, indication of availability per RB set associated with a soft type in symbols having a symbol type of uplink symbol with no indication of availability per RB set in symbols having a symbol type of downlink symbol or flexible symbol, indication of availability per RB set associated with a soft type in symbols having a symbol type of downlink symbol or uplink symbol with no indication of availability per RB set in symbols having a symbol type of flexible symbol, indication of availability per RB set associated with a soft type in symbols having a symbol type of flexible symbol with no indication of availability per RB set in symbols having a symbol type of downlink symbol or uplink symbol, indication of availability per RB set associated with a soft type in symbols having a symbol type of downlink symbol or flexible symbol with no indication of availability per RB set in symbols having a symbol type of uplink symbol, indication of availability per RB set associated with a soft type in symbols having a symbol type of uplink symbol or flexible symbol with no indication of availability per RB set in symbols having a symbol type of downlink symbol, or indication of availability per RB set associated with a soft type in all of the symbols.

In Aspect 72, the IAB node of any of Aspects 69 to 71 includes where the indication of the one or more selected RB sets includes a bitmap for each symbol, where each bit in the bitmap indicates selection of one RB set of the multiple configured RB sets.

In Aspect 73, the IAB node of any of Aspects 69 to 71 includes where the indication of the one or more selected RB sets includes one or more indices of RB sets corresponding to the one or more selected RB sets.

In Aspect 74, the IAB node of any of Aspects 69 to 73 includes where the one or more processors are configured to receive the indication from the upstream node in a MAC-CE including the indication of the one or more selected RB sets of the multiple configured RB sets for each cell of the IAB node.

In Aspect 75, the IAB node of any of Aspects 69 to 73 includes where the indication of one or more selected RB sets is received in the configuration.

In Aspect 76, the IAB node of any of Aspects 69 to 73 includes where the configuration indicates, for each respective slot in each respective resource availability combination of the multiple resource availability combinations, the one or more selected RB sets of the multiple configured RB sets that correspond to the respective slot.

In Aspect 77, the IAB node of any of Aspects 69 to 73 includes where the DCI indicates the one or more selected RB sets to which the one resource availability combination applies for the one or more cells of the IAB node.

In Aspect 78, the IAB node of Aspect 77 includes where the DCI indicates the one or more selected RB sets as one of an index of an applicable RB set or a bitmap indicating the one or more selected RB sets out of the multiple configured RB sets.

In Aspect 79, the IAB node of any of Aspects 69 to 73 includes where the one or more processors are configured to receive the indication from the upstream node as a second DCI that indicates the one or more selected RB sets to which the one resource availability combination applies for the one or more cells of the IAB node.

In Aspect 80, the IAB node of Aspect 79 includes where the second DCI indicates the one or more selected RB sets as one of an index of an applicable RB set or a bitmap indicating the one or more selected RB sets out of the multiple configured RB sets.

In Aspect 81, the IAB node of any of Aspects 69 to 80 includes where the configuration indicates the resource availability for only a subset of the multiple slots that include symbols having RB sets associated with a soft type.

Aspect 82 is a node for wireless communication including a transceiver, a memory configured to store instructions, and one or more processors communicatively coupled with the memory and the transceiver, where the one or more processors are configured to transmit, to a downstream IAB node, a configuration for each cell of the downstream IAB node indicating multiple resource availability combinations with each resource availability combination over multiple slots, where each item in each resource availability combination indicates a resource availability for multiple configured RB sets in one slot, transmit, to the downstream IAB node, an indication of one or more selected RB sets out of the multiple configured RB sets, and transmit, to the downstream IAB node, a DCI indicating one resource availability combination of the multiple resource availability combinations for one or more cells of the downstream IAB node.

In Aspect 83, the node of Aspect 82 includes where the resource availability indicated by a given item of the one resource availability combination for the one slot corresponds to the one or more selected RB sets at symbols in the one slot.

In Aspect 84, the node of Aspect 83 includes where the given item indicates the one resource availability combination in the one slot as one of no indication of availability per RB set associated with a soft type in all of the symbols, indication of availability per RB set associated with a soft type in symbols having a symbol type of downlink symbol with no indication of availability per RB set in symbols having a symbol type of uplink symbol or flexible symbol, indication of availability per RB set associated with a soft type in symbols having a symbol type of uplink symbol with no indication of availability per RB set in symbols having a symbol type of downlink symbol or flexible symbol, indication of availability per RB set associated with a soft type in symbols having a symbol type of downlink symbol or uplink symbol with no indication of availability per RB set in symbols having a symbol type of flexible symbol, indication of availability per RB set associated with a soft type in symbols having a symbol type of flexible symbol with no indication of availability per RB set in symbols having a symbol type of downlink symbol or uplink symbol, indication of availability per RB set associated with a soft type in symbols having a symbol type of downlink symbol or flexible symbol with no indication of availability per RB set in symbols having a symbol type of uplink symbol, indication of availability per RB set associated with a soft type in symbols having a symbol type of uplink symbol or flexible symbol with no indication of availability per RB set in symbols having a symbol type of downlink symbol, or indication of availability per RB set associated with a soft type in all of the symbols.

In Aspect 85, the node of any of Aspects 82 to 84 includes where the indication of the one or more selected RB sets includes a bitmap for each symbol, where each bit in the bitmap indicates selection of one RB set of the multiple configured RB sets.

In Aspect 86, the node of any of Aspects 82 to 84 includes where the indication of the one or more selected RB sets includes one or more indices of RB sets corresponding to the one or more selected RB sets.

In Aspect 87, the node of any of Aspects 82 to 86 includes where the one or more processors are configured to transmit the indication in a MAC-CE including the indication of the one or more selected RB sets of the multiple configured RB sets for each cell of the IAB node.

In Aspect 88, the node of any of Aspects 82 to 86 includes where the indication of one or more selected RB sets is received in the configuration.

In Aspect 89, the node of any of Aspects 82 to 86 includes where the configuration indicates, for each respective slot in each respective resource availability combination of the multiple resource availability combinations, the one or more selected RB sets of the multiple configured RB sets that correspond to the respective slot.

In Aspect 90, the node of any of Aspects 82 to 86 includes where the DCI indicates the one or more selected RB sets to which the one resource availability combination applies for the one or more cells of the IAB node.

In Aspect 91, the node of Aspect 90 includes where the DCI indicates the one or more selected RB sets as one of an index of an applicable RB set or a bitmap indicating the one or more selected RB sets out of the multiple configured RB sets.

In Aspect 92, the node of any of Aspects 82 to 86 includes where the one or more processors are configured to transmit the indication as a second DCI that indicates the one or more selected RB sets to which the one resource availability combination applies for the one or more cells of the IAB node.

In Aspect 93, the node of Aspect 92 includes where the second DCI indicates the one or more selected RB sets as one of an index of an applicable RB set or a bitmap indicating the one or more selected RB sets out of the multiple configured RB sets.

In Aspect 94, the node of any of Aspects 82 to 93 includes where the configuration indicates the resource availability for only a subset of the multiple slots that include symbols having RB sets associated with a soft type.

Aspect 95 is an IAB node for wireless communication including a transceiver, a memory configured to store instructions, and one or more processors communicatively coupled with the memory and the transceiver, where the one or more processors are configured to receive, from an upstream node, a configuration for each cell of the IAB node indicating multiple resource availability combinations with each resource availability combination over multiple slots, where each item in each resource availability combination indicates a resource availability per RB set of multiple configured RB sets of one slot, receive, from the upstream node, a DCI indicating one resource availability combination of the multiple resource availability combinations for one or more cells of the IAB node, and communicate, by the one or more cells of the IAB node and in the one slot, over one or more RB sets of the multiple configured RB sets in symbols indicated as available by the one resource availability combination.

In Aspect 96, the IAB node of Aspect 95 includes where the configuration indicates the resource availability as a value, for each slot of the multiple slots, where the value indicates resource availability per RB set of multiple configured RB sets within the configured bandwidth for each of the multiple symbol types.

In Aspect 97, the IAB node of Aspect 95 includes where the configuration indicates the resource availability for multiple combinations of slots of the multiple slots and RB sets of the multiple configured RB sets.

In Aspect 98, the IAB node of Aspect 97 includes where the configuration indicates, for a given item of the one resource availability combination, the resource availability as one of no indication of availability per RB set associated with a soft type in all of the symbols, indication of availability per RB set associated with a soft type in symbols having a symbol type of downlink symbol with no indication of availability per RB set in symbols having a symbol type of uplink symbol or flexible symbol, indication of availability per RB set associated with a soft type in symbols having a symbol type of uplink symbol with no indication of availability per RB set in symbols having a symbol type of downlink symbol or flexible symbol, indication of availability per RB set associated with a soft type in symbols having a symbol type of downlink symbol or uplink symbol with no indication of availability per RB set in symbols having a symbol type of flexible symbol, indication of availability per RB set associated with a soft type in symbols having a symbol type of flexible symbol with no indication of availability per RB set in symbols having a symbol type of downlink symbol or uplink symbol, indication of availability per RB set associated with a soft type in symbols having a symbol type of downlink symbol or flexible symbol with no indication of availability per RB set in symbols having a symbol type of uplink symbol, indication of availability per RB set associated with a soft type in symbols having a symbol type of uplink symbol or flexible symbol with no indication of availability per RB set in symbols having a symbol type of downlink symbol, or indication of availability per RB set associated with a soft type in all of the symbols.

In Aspect 99, the IAB node of Aspect 97 includes where the configuration indicates the resource availability for the multiple combinations in multiple rows of a table, where each row is arranged by RB set and then slot.

In Aspect 100, the IAB node of Aspect 97 includes where the configuration indicates the resource availability for the multiple combinations in multiple rows of a table, where each row is arranged by slot then RB set.

In Aspect 101, the IAB node of Aspect 95 includes where the DCI indicates a set of resource availability combinations each corresponding to a different RB set, and where the one or more processors are configured to communicate over the one or more RB sets of the multiple configured RB sets in symbols indicated as available based on determining the resource availability combination, from the set of resource availability combinations, based on the one or more RB sets.

In Aspect 102, the IAB node of Aspect 101 includes where the DCI indicates the set of resource availability combinations each corresponding to a different RB set in different rows of a table.

In Aspect 103, the IAB node of Aspect 101 includes where the DCI indicates the set of resource availability combinations in different tables each corresponding to a different RB set.

In Aspect 104, the IAB node of Aspect 95 includes where the one or more processors are further configured to receive, from the upstream node, a second DCI that indicates the one or more RB sets to which the one resource availability combination applies for the one or more cells of the IAB node.

In Aspect 105, the IAB node of any of Aspects 95 to 104 includes where the configuration indicates the resource availability for only a subset of the multiple slots that include symbols having RB sets associated with a soft type.

Aspect 106 is a node for wireless communication including a transceiver, a memory configured to store instructions, and one or more processors communicatively coupled with the memory and the transceiver, where the one or more processors are configured to transmit, to a downstream IAB node, a configuration for each cell of the downstream IAB node indicating multiple resource availability combinations with each resource availability combination over multiple slots, where each item in each resource availability combination indicates a resource availability per RB set of multiple configured RB sets of one slot, and transmit, to the downstream IAB node, a DCI indicating one resource availability combination of the multiple resource availability combinations for one or more cells of the downstream IAB node.

In Aspect 107, the node of Aspect 106 includes where the configuration indicates the resource availability as a value, for each slot of the multiple slots, where the value indicates resource availability per RB set of multiple configured RB sets within the configured bandwidth for each of the multiple symbol types.

In Aspect 108, the node of Aspect 106 includes where the configuration indicates the resource availability for multiple combinations of slots of the multiple slots and RB sets of the multiple configured RB sets.

In Aspect 109, the node of Aspect 108 includes where the configuration indicates, for a given item of the one resource availability combination, the resource availability as one of no indication of availability per RB set associated with a soft type in all of the symbols, indication of availability per RB set associated with a soft type in symbols having a symbol type of downlink symbol with no indication of availability per RB set in symbols having a symbol type of uplink symbol or flexible symbol, indication of availability per RB set associated with a soft type in symbols having a symbol type of uplink symbol with no indication of availability per RB set in symbols having a symbol type of downlink symbol or flexible symbol, indication of availability per RB set associated with a soft type in symbols having a symbol type of downlink symbol or uplink symbol with no indication of availability per RB set in symbols having a symbol type of flexible symbol, indication of availability per RB set associated with a soft type in symbols having a symbol type of flexible symbol with no indication of availability per RB set in symbols having a symbol type of downlink symbol or uplink symbol, indication of availability per RB set associated with a soft type in symbols having a symbol type of downlink symbol or flexible symbol with no indication of availability per RB set in symbols having a symbol type of uplink symbol, indication of availability per RB set associated with a soft type in symbols having a symbol type of uplink symbol or flexible symbol with no indication of availability per RB set in symbols having a symbol type of downlink symbol, or indication of availability per RB set associated with a soft type in all of the symbols.

In Aspect 110, the node of Aspect 108 includes where the configuration indicates the resource availability for the multiple combinations in multiple rows of a table, where each row is arranged by RB set and then slot.

In Aspect 111, the node of Aspect 108 includes where the configuration indicates the resource availability for the multiple combinations in multiple rows of a table, where each row is arranged by slot then RB set.

In Aspect 112, the node of Aspect 106 includes where the DCI indicates a set of resource availability combinations each corresponding to a different RB set.

In Aspect 113, the node of Aspect 112 includes where the DCI indicates the set of resource availability combinations each corresponding to a different RB set in different rows of a table.

In Aspect 114, the node of Aspect 112 includes where the DCI indicates the set of resource availability combinations in different tables each corresponding to a different RB set.

In Aspect 115, the node of Aspect 106 includes where the one or more processors are further configured to transmit, to the downstream IAB node, a second DCI that indicates the one or more RB sets to which the one resource availability combination applies for the one or more cells of the downstream IAB node.

In Aspect 116, the node of any of Aspects 106 to 115 includes where the configuration indicates the resource availability for only a subset of the multiple slots that include symbols having RB sets associated with a soft type.

Aspect 117 is an IAB node for wireless communication including means for receiving, from an upstream node, a configuration for each cell of the IAB node indicating multiple resource availability combinations with each resource availability combination over multiple slots, where each item in each resource availability combination indicates a resource availability for multiple configured RB sets in one slot, means for receiving, from the upstream node, a DCI indicating one resource availability combination of the multiple resource availability combinations for one or more cells of the IAB node, and means for communicating, by the one or more cells of the IAB node and in the one slot, over one or more RB sets of the multiple configured RB sets in symbols indicated as available by the one resource availability combination.

In Aspect 118, the IAB node of Aspect 117 includes where the resource availability indicated by a given item of the one resource availability combination for the one slot corresponds to all RB sets associated with a soft type being indicated as available at symbols in the one slot.

In Aspect 119, the IAB node of Aspect 118 includes where the given item indicates the one resource availability combination in the one slot as one of no indication of availability for all RB sets associated with the soft type in all of the symbols, indication of availability for all RB sets associated with the soft type in symbols having a symbol type of downlink symbol with no indication of availability for all RB sets in symbols having a symbol type of uplink symbol or flexible symbol, indication of availability for all RB sets associated with the soft type in symbols having a symbol type of uplink symbol with no indication of availability for all RB sets in symbols having a symbol type of downlink symbol or flexible symbol, indication of availability for all RB sets associated with the soft type in symbols having a symbol type of downlink symbol or uplink symbol with no indication of availability for all RB sets in symbols having a symbol type of flexible symbol, indication of availability for all RB sets associated with the soft type in symbols having a symbol type of flexible symbol with no indication of availability for all RB sets in symbols having a symbol type of downlink symbol or uplink symbol, indication of availability for all RB sets associated with the soft type in symbols having a symbol type of downlink symbol or flexible symbol with no indication of availability for all RB sets in symbols having a symbol type of uplink symbol, indication of availability for all RB sets associated with the soft type in symbols having a symbol type of uplink symbol or flexible symbol with no indication of availability for all RB sets in symbols having a symbol type of downlink symbol, or indication of availability for all RB sets associated with the soft type in all of the symbols.

In Aspect 120, the IAB node of any of Aspects 117 to 119 includes where the means for communicating communicates over the one or more RB sets in a given symbol of the slot based on determining that the one or more RB sets are associated with a soft type for the given symbol and determining that the given symbol is of a symbol type indicated as available in the slot based on the one resource availability combination.

In Aspect 121, the IAB node of Aspect 120 includes where the symbol type is one of a downlink symbol, an uplink symbol, or a flexible symbol.

In Aspect 122, the IAB node of any of Aspects 117 to 121 includes where the configuration indicates the resource availability for only a subset of the multiple slots that include symbols having RB sets associated with a soft type.

Aspect 123 is a node for wireless communication including means for transmitting, to a downstream IAB node, a configuration for each cell of the downstream IAB node indicating multiple resource availability combinations with each resource availability combination over multiple slots, where each item in each resource availability combination indicates a resource availability for multiple configured RB sets in one slot, and means for transmitting, to the downstream IAB node, a DCI indicating one resource availability combination of the multiple resource availability combinations for one or more cells of the downstream IAB node.

In Aspect 124, the node of Aspect 123 includes where the resource availability indicated by a given item of the one resource availability combination for the one slot corresponds to all RB sets associated with a soft type being indicated as available at symbols in the one slot.

In Aspect 125, the node of Aspect 124 includes where the given item indicates the one resource availability combination in the one slot as one of no indication of availability for all RB sets associated with the soft type in all of the symbols, indication of availability for all RB sets associated with the soft type in symbols having a symbol type of downlink symbol with no indication of availability for all RB sets in symbols having a symbol type of uplink symbol or flexible symbol, indication of availability for all RB sets associated with the soft type in symbols having a symbol type of uplink symbol with no indication of availability for all RB sets in symbols having a symbol type of downlink symbol or flexible symbol, indication of availability for all RB sets associated with the soft type in symbols having a symbol type of downlink symbol or uplink symbol with no indication of availability for all RB sets in symbols having a symbol type of flexible symbol, indication of availability for all RB sets associated with the soft type in symbols having a symbol type of flexible symbol with no indication of availability for all RB sets in symbols having a symbol type of downlink symbol or uplink symbol, indication of availability for all RB sets associated with the soft type in symbols having a symbol type of downlink symbol or flexible symbol with no indication of availability for all RB sets in symbols having a symbol type of uplink symbol, indication of availability for all RB sets associated with the soft type in symbols having a symbol type of uplink symbol or flexible symbol with no indication of availability for all RB sets in symbols having a symbol type of downlink symbol, or indication of availability for all RB sets associated with the soft type in all of the symbols.

In Aspect 126, the node of any of Aspects 123 to 125 includes where the configuration indicates the resource availability for only a subset of the multiple slots that include symbols having RB sets associated with a soft type.

Aspect 127 is an IAB node for wireless communication including means for receiving, from an upstream node, a configuration for each cell of the IAB node indicating multiple resource availability combinations with each resource availability combination over multiple slots, where each item in each resource availability combination indicates a resource availability for multiple configured RB sets in one slot, means for receiving, from the upstream node, an indication of one or more selected RB sets out of the multiple configured RB sets, means for receiving, from the upstream node, a DCI indicating one resource availability combination of the multiple resource availability combinations for one or more cells of the IAB node, and means for communicating, by the one or more cells of the IAB node and in the one slot, over the one or more selected RB sets in symbols indicated as available by the one resource availability combination.

In Aspect 128, the IAB node of Aspect 127 includes where the resource availability indicated by a given item of the one resource availability combination for the one slot corresponds to the one or more selected RB sets at symbols in the one slot.

In Aspect 129, the IAB node of Aspect 128 includes where the given item indicates the one resource availability combination in the one slot as one of no indication of availability per RB set associated with a soft type in all of the symbols, indication of availability per RB set associated with a soft type in symbols having a symbol type of downlink symbol with no indication of availability per RB set in symbols having a symbol type of uplink symbol or flexible symbol, indication of availability per RB set associated with a soft type in symbols having a symbol type of uplink symbol with no indication of availability per RB set in symbols having a symbol type of downlink symbol or flexible symbol, indication of availability per RB set associated with a soft type in symbols having a symbol type of downlink symbol or uplink symbol with no indication of availability per RB set in symbols having a symbol type of flexible symbol, indication of availability per RB set associated with a soft type in symbols having a symbol type of flexible symbol with no indication of availability per RB set in symbols having a symbol type of downlink symbol or uplink symbol, indication of availability per RB set associated with a soft type in symbols having a symbol type of downlink symbol or flexible symbol with no indication of availability per RB set in symbols having a symbol type of uplink symbol, indication of availability per RB set associated with a soft type in symbols having a symbol type of uplink symbol or flexible symbol with no indication of availability per RB set in symbols having a symbol type of downlink symbol, or indication of availability per RB set associated with a soft type in all of the symbols.

In Aspect 130, the IAB node of any of Aspects 127 to 129 includes where the indication of the one or more selected RB sets includes a bitmap for each symbol, where each bit in the bitmap indicates selection of one RB set of the multiple configured RB sets.

In Aspect 131, the IAB node of any of Aspects 127 to 129 includes where the indication of the one or more selected RB sets includes one or more indices of RB sets corresponding to the one or more selected RB sets.

In Aspect 132, the IAB node of any of Aspects 127 to 131 includes where the means for receiving the indication receives the indication from the upstream node in a MAC-CE including the indication of the one or more selected RB sets of the multiple configured RB sets for each cell of the IAB node.

In Aspect 133, the IAB node of any of Aspects 127 to 131 includes where the indication of one or more selected RB sets is received in the configuration.

In Aspect 134, the IAB node of any of Aspects 127 to 131 includes where the configuration indicates, for each respective slot in each respective resource availability combination of the multiple resource availability combinations, the one or more selected RB sets of the multiple configured RB sets that correspond to the respective slot.

In Aspect 135, the IAB node of any of Aspects 127 to 131 includes where the DCI indicates the one or more selected RB sets to which the one resource availability combination applies for the one or more cells of the IAB node.

In Aspect 136, the IAB node of Aspect 135 includes where the DCI indicates the one or more selected RB sets as one of an index of an applicable RB set or a bitmap indicating the one or more selected RB sets out of the multiple configured RB sets.

In Aspect 137, the IAB node of any of Aspects 127 to 131 includes where the means for receiving the indication receives the indication from the upstream node as a second DCI that indicates the one or more selected RB sets to which the one resource availability combination applies for the one or more cells of the IAB node.

In Aspect 138, the IAB node of Aspect 137 includes where the second DCI indicates the one or more selected RB sets as one of an index of an applicable RB set or a bitmap indicating the one or more selected RB sets out of the multiple configured RB sets.

In Aspect 139, the IAB node of any of Aspects 127 to 138 includes where the configuration indicates the resource availability for only a subset of the multiple slots that include symbols having RB sets associated with a soft type.

Aspect 140 is a node for wireless communication including means for transmitting, to a downstream IAB node, a configuration for each cell of the downstream IAB node indicating multiple resource availability combinations with each resource availability combination over multiple slots, where each item in each resource availability combination indicates a resource availability for multiple configured RB sets in one slot, means for transmitting, to the downstream IAB node, an indication of one or more selected RB sets out of the multiple configured RB sets, and means for transmitting, to the downstream IAB node, a DCI indicating one resource availability combination of the multiple resource availability combinations for one or more cells of the downstream IAB node.

In Aspect 141, the node of Aspect 140 includes where the resource availability indicated by a given item of the one resource availability combination for the one slot corresponds to the one or more selected RB sets at symbols in the one slot.

In Aspect 142, the node of Aspect 141 includes where the given item indicates the one resource availability combination in the one slot as one of no indication of availability per RB set associated with a soft type in all of the symbols, indication of availability per RB set associated with a soft type in symbols having a symbol type of downlink symbol with no indication of availability per RB set in symbols having a symbol type of uplink symbol or flexible symbol, indication of availability per RB set associated with a soft type in symbols having a symbol type of uplink symbol with no indication of availability per RB set in symbols having a symbol type of downlink symbol or flexible symbol, indication of availability per RB set associated with a soft type in symbols having a symbol type of downlink symbol or uplink symbol with no indication of availability per RB set in symbols having a symbol type of flexible symbol, indication of availability per RB set associated with a soft type in symbols having a symbol type of flexible symbol with no indication of availability per RB set in symbols having a symbol type of downlink symbol or uplink symbol, indication of availability per RB set associated with a soft type in symbols having a symbol type of downlink symbol or flexible symbol with no indication of availability per RB set in symbols having a symbol type of uplink symbol, indication of availability per RB set associated with a soft type in symbols having a symbol type of uplink symbol or flexible symbol with no indication of availability per RB set in symbols having a symbol type of downlink symbol, or indication of availability per RB set associated with a soft type in all of the symbols.

In Aspect 143, the node of any of Aspects 140 to 142 includes where the indication of the one or more selected RB sets includes a bitmap for each symbol, where each bit in the bitmap indicates selection of one RB set of the multiple configured RB sets.

In Aspect 144, the node of any of Aspects 140 to 142 includes where the indication of the one or more selected RB sets includes one or more indices of RB sets corresponding to the one or more selected RB sets.

In Aspect 145, the node of any of Aspects 140 to 144 includes where the means for transmitting the indication transmits the indication in a MAC-CE including the indication of the one or more selected RB sets of the multiple configured RB sets for each cell of the IAB node.

In Aspect 146, the node of any of Aspects 140 to 144 includes where the indication of one or more selected RB sets is received in the configuration.

In Aspect 147, the node of any of Aspects 140 to 144 includes where the configuration indicates, for each respective slot in each respective resource availability combination of the multiple resource availability combinations, the one or more selected RB sets of the multiple configured RB sets that correspond to the respective slot.

In Aspect 148, the node of any of Aspects 140 to 144 includes where the DCI indicates the one or more selected RB sets to which the one resource availability combination applies for the one or more cells of the IAB node.

In Aspect 149, the node of Aspect 148 includes where the DCI indicates the one or more selected RB sets as one of an index of an applicable RB set or a bitmap indicating the one or more selected RB sets out of the multiple configured RB sets.

In Aspect 150, the node of any of Aspects 140 to 144 includes where the means for transmitting the indication transmits the indication as a second DCI that indicates the one or more selected RB sets to which the one resource availability combination applies for the one or more cells of the IAB node.

In Aspect 151, the node of Aspect 150 includes where the second DCI indicates the one or more selected RB sets as one of an index of an applicable RB set or a bitmap indicating the one or more selected RB sets out of the multiple configured RB sets.

Aspect 152, the node of any of Aspects 140 to 151 includes where the configuration indicates the resource availability for only a subset of the multiple slots that include symbols having RB sets associated with a soft type.

Aspect 153 is an IAB node for wireless communication including means for receiving, from an upstream node, a configuration for each cell of the IAB node indicating multiple resource availability combinations with each resource availability combination over multiple slots, where each item in each resource availability combination indicates a resource availability per RB set of multiple configured RB sets of one slot, means for receiving, from the upstream node, a DCI indicating one resource availability combination of the multiple resource availability combinations for one or more cells of the IAB node, and means for communicating, by the one or more cells of the IAB node and in the one slot, over one or more RB sets of the multiple configured RB sets in symbols indicated as available by the one resource availability combination.

In Aspect 154, the IAB node of Aspect 153 includes where the configuration indicates the resource availability as a value, for each slot of the multiple slots, where the value indicates resource availability per RB set of multiple configured RB sets within the configured bandwidth for each of the multiple symbol types.

In Aspect 155, the IAB node of Aspect 154 includes where the configuration indicates the resource availability for multiple combinations of slots of the multiple slots and RB sets of the multiple configured RB sets.

In Aspect 156, the IAB node of Aspect 155 includes where the configuration indicates, for a given item of the one resource availability combination, the resource availability as one of no indication of availability per RB set associated with a soft type in all of the symbols, indication of availability per RB set associated with a soft type in symbols having a symbol type of downlink symbol with no indication of availability per RB set in symbols having a symbol type of uplink symbol or flexible symbol, indication of availability per RB set associated with a soft type in symbols having a symbol type of uplink symbol with no indication of availability per RB set in symbols having a symbol type of downlink symbol or flexible symbol, indication of availability per RB set associated with a soft type in symbols having a symbol type of downlink symbol or uplink symbol with no indication of availability per RB set in symbols having a symbol type of flexible symbol, indication of availability per RB set associated with a soft type in symbols having a symbol type of flexible symbol with no indication of availability per RB set in symbols having a symbol type of downlink symbol or uplink symbol, indication of availability per RB set associated with a soft type in symbols having a symbol type of downlink symbol or flexible symbol with no indication of availability per RB set in symbols having a symbol type of uplink symbol, indication of availability per RB set associated with a soft type in symbols having a symbol type of uplink symbol or flexible symbol with no indication of availability per RB set in symbols having a symbol type of downlink symbol, or indication of availability per RB set associated with a soft type in all of the symbols.

In Aspect 157, the IAB node of Aspect 155 includes where the configuration indicates the resource availability for the multiple combinations in multiple rows of a table, where each row is arranged by RB set and then slot.

In Aspect 158, the IAB node of Aspect 155 includes where the configuration indicates the resource availability for the multiple combinations in multiple rows of a table, where each row is arranged by slot then RB set.

In Aspect 159, the IAB node of Aspect 153 includes where the DCI indicates a set of resource availability combinations each corresponding to a different RB set, and where the means for communicating communicates over the one or more RB sets of the multiple configured RB sets in symbols indicated as available based on determining the resource availability combination, from the set of resource availability combinations, based on the one or more RB sets.

In Aspect 160, the IAB node of Aspect 159 includes where the DCI indicates the set of resource availability combinations each corresponding to a different RB set in different rows of a table.

In Aspect 161, the IAB node of Aspect 159 includes where the DCI indicates the set of resource availability combinations in different tables each corresponding to a different RB set.

In Aspect 162, the IAB node of Aspect 153 includes means for receiving, from the upstream node, a second DCI that indicates the one or more RB sets to which the one resource availability combination applies for the one or more cells of the IAB node.

In Aspect 163, the IAB node of any of Aspects 153 to 162 includes where the configuration indicates the resource availability for only a subset of the multiple slots that include symbols having RB sets associated with a soft type.

Aspect 164 is a node for wireless communication including means for transmitting, to a downstream IAB node, a configuration for each cell of the downstream IAB node indicating multiple resource availability combinations with each resource availability combination over multiple slots, where each item in each resource availability combination indicates a resource availability per RB set of multiple configured RB sets of one slot, and means for transmitting, to the downstream IAB node, a DCI indicating one resource availability combination of the multiple resource availability combinations for one or more cells of the downstream IAB node.

In Aspect 165, the node of Aspect 164 includes where the configuration indicates the resource availability as a value, for each slot of the multiple slots, where the value indicates resource availability per RB set of multiple configured RB sets within the configured bandwidth for each of the multiple symbol types.

In Aspect 166, the node of Aspect 164 includes where the configuration indicates the resource availability for multiple combinations of slots of the multiple slots and RB sets of the multiple configured RB sets.

In Aspect 167, the node of Aspect 166 includes where the configuration indicates, for a given item of the one resource availability combination, the resource availability as one of no indication of availability per RB set associated with a soft type in all of the symbols, indication of availability per RB set associated with a soft type in symbols having a symbol type of downlink symbol with no indication of availability per RB set in symbols having a symbol type of uplink symbol or flexible symbol, indication of availability per RB set associated with a soft type in symbols having a symbol type of uplink symbol with no indication of availability per RB set in symbols having a symbol type of downlink symbol or flexible symbol, indication of availability per RB set associated with a soft type in symbols having a symbol type of downlink symbol or uplink symbol with no indication of availability per RB set in symbols having a symbol type of flexible symbol, indication of availability per RB set associated with a soft type in symbols having a symbol type of flexible symbol with no indication of availability per RB set in symbols having a symbol type of downlink symbol or uplink symbol, indication of availability per RB set associated with a soft type in symbols having a symbol type of downlink symbol or flexible symbol with no indication of availability per RB set in symbols having a symbol type of uplink symbol, indication of availability per RB set associated with a soft type in symbols having a symbol type of uplink symbol or flexible symbol with no indication of availability per RB set in symbols having a symbol type of downlink symbol, or indication of availability per RB set associated with a soft type in all of the symbols.

In Aspect 168, the node of Aspect 166 includes where the configuration indicates the resource availability for the multiple combinations in multiple rows of a table, where each row is arranged by RB set and then slot.

In Aspect 169, the node of Aspect 166 includes where the configuration indicates the resource availability for the multiple combinations in multiple rows of a table, where each row is arranged by slot then RB set.

In Aspect 170, the node of Aspect 164 includes where the DCI indicates a set of resource availability combinations each corresponding to a different RB set.

In Aspect 171, the node of Aspect 170 includes where the DCI indicates the set of resource availability combinations each corresponding to a different RB set in different rows of a table.

In Aspect 172, the node of Aspect 170 includes where the DCI indicates the set of resource availability combinations in different tables each corresponding to a different RB set.

In Aspect 173, the node of Aspect 164 includes means for transmitting, to the downstream IAB node, a second DCI that indicates the one or more RB sets to which the one resource availability combination applies for the one or more cells of the downstream IAB node.

In Aspect 174, the node of any of Aspects 164 to 173 includes where the configuration indicates the resource availability for only a subset of the multiple slots that include symbols having RB sets associated with a soft type.

Aspect 175 is a computer-readable medium including code executable by one or more processors for communicating at an IAB node in a wireless network, the code including code for receiving, from an upstream node, a configuration for each cell of the IAB node indicating multiple resource availability combinations with each resource availability combination over multiple slots, where each item in each resource availability combination indicates a resource availability for multiple configured RB sets in one slot, code for receiving, from the upstream node, a DCI indicating one resource availability combination of the multiple resource availability combinations for one or more cells of the IAB node, and code for communicating, by the one or more cells of the IAB node and in the one slot, over one or more RB sets of the multiple configured RB sets in symbols indicated as available by the one resource availability combination.

In Aspect 176, the computer-readable medium of Aspect 175 includes where the resource availability indicated by a given item of the one resource availability combination for the one slot corresponds to all RB sets associated with a soft type being indicated as available at symbols in the one slot.

In Aspect 177, the computer-readable medium of Aspect 176 includes where the given item indicates the one resource availability combination in the one slot as one of no indication of availability for all RB sets associated with the soft type in all of the symbols, indication of availability for all RB sets associated with the soft type in symbols having a symbol type of downlink symbol with no indication of availability for all RB sets in symbols having a symbol type of uplink symbol or flexible symbol, indication of availability for all RB sets associated with the soft type in symbols having a symbol type of uplink symbol with no indication of availability for all RB sets in symbols having a symbol type of downlink symbol or flexible symbol, indication of availability for all RB sets associated with the soft type in symbols having a symbol type of downlink symbol or uplink symbol with no indication of availability for all RB sets in symbols having a symbol type of flexible symbol, indication of availability for all RB sets associated with the soft type in symbols having a symbol type of flexible symbol with no indication of availability for all RB sets in symbols having a symbol type of downlink symbol or uplink symbol, indication of availability for all RB sets associated with the soft type in symbols having a symbol type of downlink symbol or flexible symbol with no indication of availability for all RB sets in symbols having a symbol type of uplink symbol, indication of availability for all RB sets associated with the soft type in symbols having a symbol type of uplink symbol or flexible symbol with no indication of availability for all RB sets in symbols having a symbol type of downlink symbol, or indication of availability for all RB sets associated with the soft type in all of the symbols.

In Aspect 178, the computer-readable medium of any of Aspects 175 to 177, where the code for communicating communicates over the one or more RB sets in a given symbol of the slot based on determining that the one or more RB sets are associated with a soft type for the given symbol and determining that the given symbol is of a symbol type indicated as available in the slot based on the one resource availability combination.

In Aspect 179, the computer-readable medium of Aspect 178 includes where the symbol type is one of a downlink symbol, an uplink symbol, or a flexible symbol.

In Aspect 180, the computer-readable medium of any of Aspects 175 to 179 includes where the configuration indicates the resource availability for only a subset of the multiple slots that include symbols having RB sets associated with a soft type.

Aspect 181 is a computer-readable medium including code executable by one or more processors for communicating at a node in a wireless network, the code includes code for transmitting, to a downstream IAB node, a configuration for each cell of the downstream IAB node indicating multiple resource availability combinations with each resource availability combination over multiple slots, where each item in each resource availability combination indicates a resource availability for multiple configured RB sets in one slot, and code for transmitting, to the downstream IAB node, a DCI indicating one resource availability combination of the multiple resource availability combinations for one or more cells of the downstream IAB node.

In Aspect 182, the computer-readable medium of Aspect 181 includes where the resource availability indicated by a given item of the one resource availability combination for the one slot corresponds to all RB sets associated with a soft type being indicated as available at symbols in the one slot.

In Aspect 183, the computer-readable medium of Aspect 182 includes where the given item indicates the one resource availability combination in the one slot as one of no indication of availability for all RB sets associated with the soft type in all of the symbols, indication of availability for all RB sets associated with the soft type in symbols having a symbol type of downlink symbol with no indication of availability for all RB sets in symbols having a symbol type of uplink symbol or flexible symbol, indication of availability for all RB sets associated with the soft type in symbols having a symbol type of uplink symbol with no indication of availability for all RB sets in symbols having a symbol type of downlink symbol or flexible symbol, indication of availability for all RB sets associated with the soft type in symbols having a symbol type of downlink symbol or uplink symbol with no indication of availability for all RB sets in symbols having a symbol type of flexible symbol, indication of availability for all RB sets associated with the soft type in symbols having a symbol type of flexible symbol with no indication of availability for all RB sets in symbols having a symbol type of downlink symbol or uplink symbol, indication of availability for all RB sets associated with the soft type in symbols having a symbol type of downlink symbol or flexible symbol with no indication of availability for all RB sets in symbols having a symbol type of uplink symbol, indication of availability for all RB sets associated with the soft type in symbols having a symbol type of uplink symbol or flexible symbol with no indication of availability for all RB sets in symbols having a symbol type of downlink symbol, or indication of availability for all RB sets associated with the soft type in all of the symbols.

In Aspect 184, the computer-readable medium of any of Aspects 181 to 183, where the configuration indicates the resource availability for only a subset of the multiple slots that include symbols having RB sets associated with a soft type.

Aspect 185 is a computer-readable medium including code executable by one or more processors for communicating at an IAB node in a wireless network, the code includes code for receiving, from an upstream node, a configuration for each cell of the IAB node indicating multiple resource availability combinations with each resource availability combination over multiple slots, where each item in each resource availability combination indicates a resource availability for multiple configured RB sets in one slot, code for receiving, from the upstream node, an indication of one or more selected RB sets out of the multiple configured RB sets, code for receiving, from the upstream node, a DCI indicating one resource availability combination of the multiple resource availability combinations for one or more cells of the IAB node, and code for communicating, by the one or more cells of the IAB node and in the one slot, over the one or more selected RB sets in symbols indicated as available by the one resource availability combination.

In Aspect 186, the computer-readable medium of Aspect 185 includes where the resource availability indicated by a given item of the one resource availability combination for the one slot corresponds to the one or more selected RB sets at symbols in the one slot.

In Aspect 187, the computer-readable medium of Aspect 186 includes where the given item indicates the one resource availability combination in the one slot as one of no indication of availability per RB set associated with a soft type in all of the symbols, indication of availability per RB set associated with a soft type in symbols having a symbol type of downlink symbol with no indication of availability per RB set in symbols having a symbol type of uplink symbol or flexible symbol, indication of availability per RB set associated with a soft type in symbols having a symbol type of uplink symbol with no indication of availability per RB set in symbols having a symbol type of downlink symbol or flexible symbol, indication of availability per RB set associated with a soft type in symbols having a symbol type of downlink symbol or uplink symbol with no indication of availability per RB set in symbols having a symbol type of flexible symbol, indication of availability per RB set associated with a soft type in symbols having a symbol type of flexible symbol with no indication of availability per RB set in symbols having a symbol type of downlink symbol or uplink symbol, indication of availability per RB set associated with a soft type in symbols having a symbol type of downlink symbol or flexible symbol with no indication of availability per RB set in symbols having a symbol type of uplink symbol, indication of availability per RB set associated with a soft type in symbols having a symbol type of uplink symbol or flexible symbol with no indication of availability per RB set in symbols having a symbol type of downlink symbol, or indication of availability per RB set associated with a soft type in all of the symbols.

In Aspect 188, the computer-readable medium of any of Aspects 185 to 187, where the indication of the one or more selected RB sets includes a bitmap for each symbol, where each bit in the bitmap indicates selection of one RB set of the multiple configured RB sets.

In Aspect 189, the computer-readable medium of any of Aspects 185 to 189 includes where the indication of the one or more selected RB sets includes one or more indices of RB sets corresponding to the one or more selected RB sets.

In Aspect 190, the computer-readable medium of any of Aspects 185 to 189 includes where the code for receiving the indication receives the indication from the upstream node in a MAC-CE including the indication of the one or more selected RB sets of the multiple configured RB sets for each cell of the IAB node.

In Aspect 191, the computer-readable medium of any of Aspects 185 to 189 includes where the indication of one or more selected RB sets is received in the configuration.

In Aspect 192, the computer-readable medium of any of Aspects 185 to 189 includes where the configuration indicates, for each respective slot in each respective resource availability combination of the multiple resource availability combinations, the one or more selected RB sets of the multiple configured RB sets that correspond to the respective slot.

In Aspect 193, the computer-readable medium of any of Aspects 185 to 189 includes where the DCI indicates the one or more selected RB sets to which the one resource availability combination applies for the one or more cells of the IAB node.

In Aspect 194, the computer-readable medium of Aspect 193 includes where the DCI indicates the one or more selected RB sets as one of an index of an applicable RB set or a bitmap indicating the one or more selected RB sets out of the multiple configured RB sets.

In Aspect 195, the computer-readable medium of any of Aspects 185 to 189, where the code for receiving the indication receives the indication from the upstream node as a second DCI that indicates the one or more selected RB sets to which the one resource availability combination applies for the one or more cells of the IAB node.

In Aspect 196, the computer-readable medium of Aspect 195 includes where the second DCI indicates the one or more selected RB sets as one of an index of an applicable RB set or a bitmap indicating the one or more selected RB sets out of the multiple configured RB sets.

In Aspect 197, the computer-readable medium of any of Aspects 185 to 196 includes where the configuration indicates the resource availability for only a subset of the multiple slots that include symbols having RB sets associated with a soft type.

Aspect 198 is a computer-readable medium including code executable by one or more processors for communicating at a node in a wireless network, the code includes code for transmitting, to a downstream IAB node, a configuration for each cell of the downstream IAB node indicating multiple resource availability combinations with each resource availability combination over multiple slots, where each item in each resource availability combination indicates a resource availability for multiple configured RB sets in one slot, code for transmitting, to the downstream IAB node, an indication of one or more selected RB sets out of the multiple configured RB sets, and code for transmitting, to the downstream IAB node, a DCI indicating one resource availability combination of the multiple resource availability combinations for one or more cells of the downstream IAB node.

In Aspect 199, the computer-readable medium of Aspect 198 includes where the resource availability indicated by a given item of the one resource availability combination for the one slot corresponds to the one or more selected RB sets at symbols in the one slot.

In Aspect 200, the computer-readable medium of Aspect 199 includes where the given item indicates the one resource availability combination in the one slot as one of no indication of availability per RB set associated with a soft type in all of the symbols, indication of availability per RB set associated with a soft type in symbols having a symbol type of downlink symbol with no indication of availability per RB set in symbols having a symbol type of uplink symbol or flexible symbol, indication of availability per RB set associated with a soft type in symbols having a symbol type of uplink symbol with no indication of availability per RB set in symbols having a symbol type of downlink symbol or flexible symbol, indication of availability per RB set associated with a soft type in symbols having a symbol type of downlink symbol or uplink symbol with no indication of availability per RB set in symbols having a symbol type of flexible symbol, indication of availability per RB set associated with a soft type in symbols having a symbol type of flexible symbol with no indication of availability per RB set in symbols having a symbol type of downlink symbol or uplink symbol, indication of availability per RB set associated with a soft type in symbols having a symbol type of downlink symbol or flexible symbol with no indication of availability per RB set in symbols having a symbol type of uplink symbol, indication of availability per RB set associated with a soft type in symbols having a symbol type of uplink symbol or flexible symbol with no indication of availability per RB set in symbols having a symbol type of downlink symbol, or indication of availability per RB set associated with a soft type in all of the symbols.

In Aspect 201, the computer-readable medium of any of Aspects 198 to 200 includes where the indication of the one or more selected RB sets includes a bitmap for each symbol, where each bit in the bitmap indicates selection of one RB set of the multiple configured RB sets.

In Aspect 202, the computer-readable medium of any of Aspects 198 to 200 includes where the indication of the one or more selected RB sets includes one or more indices of RB sets corresponding to the one or more selected RB sets.

In Aspect 203, the computer-readable medium of any of Aspects 198 to 202 includes where the code for transmitting the indication transmits the indication in a MAC-CE including the indication of the one or more selected RB sets of the multiple configured RB sets for each cell of the IAB node.

In Aspect 204, the computer-readable medium of any of Aspects 198 to 202 includes where the indication of one or more selected RB sets is received in the configuration.

In Aspect 205, the computer-readable medium of any of Aspects 198 to 202 includes where the configuration indicates, for each respective slot in each respective resource availability combination of the multiple resource availability combinations, the one or more selected RB sets of the multiple configured RB sets that correspond to the respective slot.

In Aspect 206, the computer-readable medium of any of Aspects 198 to 202 includes where the DCI indicates the one or more selected RB sets to which the one resource availability combination applies for the one or more cells of the IAB node.

In Aspect 207, the computer-readable medium of Aspect 206 includes where the DCI indicates the one or more selected RB sets as one of an index of an applicable RB set or a bitmap indicating the one or more selected RB sets out of the multiple configured RB sets.

In Aspect 208, the computer-readable medium of any of Aspects 198 to 202 includes where the code for transmitting the indication transmits the indication as a second DCI that indicates the one or more selected RB sets to which the one resource availability combination applies for the one or more cells of the IAB node.

In Aspect 209, the computer-readable medium of Aspect 208 includes where the second DCI indicates the one or more selected RB sets as one of an index of an applicable RB set or a bitmap indicating the one or more selected RB sets out of the multiple configured RB sets.

In Aspect 210, the computer-readable medium of any of Aspects 198 to 209 includes where the configuration indicates the resource availability for only a subset of the multiple slots that include symbols having RB sets associated with a soft type.

Aspect 211 is a computer-readable medium including code executable by one or more processors for communicating at an IAB node in a wireless network, the code including code for receiving, from an upstream node, a configuration for each cell of the IAB node indicating multiple resource availability combinations with each resource availability combination over multiple slots, where each item in each resource availability combination indicates a resource availability per RB set of multiple configured RB sets of one slot, code for receiving, from the upstream node, a DCI indicating one resource availability combination of the multiple resource availability combinations for one or more cells of the IAB node, and code for communicating, by the one or more cells of the IAB node and in the one slot, over one or more RB sets of the multiple configured RB sets in symbols indicated as available by the one resource availability combination.

In Aspect 212, the computer-readable medium of Aspect 211 includes where the configuration indicates the resource availability as a value, for each slot of the multiple slots, where the value indicates resource availability per RB set of multiple configured RB sets within the configured bandwidth for each of the multiple symbol types.

In Aspect 213, the computer-readable medium of Aspect 212 includes where the configuration indicates the resource availability for multiple combinations of slots of the multiple slots and RB sets of the multiple configured RB sets.

In Aspect 214, the computer-readable medium of Aspect 213 includes where the configuration indicates, for a given item of the one resource availability combination, the resource availability as one of no indication of availability per RB set associated with a soft type in all of the symbols, indication of availability per RB set associated with a soft type in symbols having a symbol type of downlink symbol with no indication of availability per RB set in symbols having a symbol type of uplink symbol or flexible symbol, indication of availability per RB set associated with a soft type in symbols having a symbol type of uplink symbol with no indication of availability per RB set in symbols having a symbol type of downlink symbol or flexible symbol, indication of availability per RB set associated with a soft type in symbols having a symbol type of downlink symbol or uplink symbol with no indication of availability per RB set in symbols having a symbol type of flexible symbol, indication of availability per RB set associated with a soft type in symbols having a symbol type of flexible symbol with no indication of availability per RB set in symbols having a symbol type of downlink symbol or uplink symbol, indication of availability per RB set associated with a soft type in symbols having a symbol type of downlink symbol or flexible symbol with no indication of availability per RB set in symbols having a symbol type of uplink symbol, indication of availability per RB set associated with a soft type in symbols having a symbol type of uplink symbol or flexible symbol with no indication of availability per RB set in symbols having a symbol type of downlink symbol, or indication of availability per RB set associated with a soft type in all of the symbols.

In Aspect 215, the computer-readable medium of Aspect 213 includes where the configuration indicates the resource availability for the multiple combinations in multiple rows of a table, where each row is arranged by RB set and then slot.

In Aspect 216, the computer-readable medium of Aspect 213 includes where the configuration indicates the resource availability for the multiple combinations in multiple rows of a table, where each row is arranged by slot then RB set.

In Aspect 217, the computer-readable medium of Aspect 211 includes where the DCI indicates a set of resource availability combinations each corresponding to a different RB set, and where the code for communicating communicates over the one or more RB sets of the multiple configured RB sets in symbols indicated as available based on determining the resource availability combination, from the set of resource availability combinations, based on the one or more RB sets.

In Aspect 218, the computer-readable medium of Aspect 217 includes where the DCI indicates the set of resource availability combinations each corresponding to a different RB set in different rows of a table.

In Aspect 219, the computer-readable medium of Aspect 217 includes where the DCI indicates the set of resource availability combinations in different tables each corresponding to a different RB set.

In Aspect 220, the computer-readable medium of Aspect 211 includes code for receiving, from the upstream node, a second DCI that indicates the one or more RB sets to which the one resource availability combination applies for the one or more cells of the IAB node.

In Aspect 221, the computer-readable medium of any of Aspects 211 to 220 includes where the configuration indicates the resource availability for only a subset of the multiple slots that include symbols having RB sets associated with a soft type.

Aspect 222 is a computer-readable medium including code executable by one or more processors for communicating at a node in a wireless network, the code includes code for transmitting, to a downstream IAB node, a configuration for each cell of the downstream IAB node indicating multiple resource availability combinations with each resource availability combination over multiple slots, where each item in each resource availability combination indicates a resource availability per RB set of multiple configured RB sets of one slot, and code for transmitting, to the downstream IAB node, a DCI indicating one resource availability combination of the multiple resource availability combinations for one or more cells of the downstream IAB node.

In Aspect 223, the computer-readable medium of Aspect 222 includes where the configuration indicates the resource availability as a value, for each slot of the multiple slots, where the value indicates resource availability per RB set of multiple configured RB sets within the configured bandwidth for each of the multiple symbol types.

In Aspect 224, the computer-readable medium of Aspect 222 includes where the configuration indicates the resource availability for multiple combinations of slots of the multiple slots and RB sets of the multiple configured RB sets.

In Aspect 225, the computer-readable medium of Aspect 224 includes where the configuration indicates, for a given item of the one resource availability combination, the resource availability as one of no indication of availability per RB set associated with a soft type in all of the symbols, indication of availability per RB set associated with a soft type in symbols having a symbol type of downlink symbol with no indication of availability per RB set in symbols having a symbol type of uplink symbol or flexible symbol, indication of availability per RB set associated with a soft type in symbols having a symbol type of uplink symbol with no indication of availability per RB set in symbols having a symbol type of downlink symbol or flexible symbol, indication of availability per RB set associated with a soft type in symbols having a symbol type of downlink symbol or uplink symbol with no indication of availability per RB set in symbols having a symbol type of flexible symbol, indication of availability per RB set associated with a soft type in symbols having a symbol type of flexible symbol with no indication of availability per RB set in symbols having a symbol type of downlink symbol or uplink symbol, indication of availability per RB set associated with a soft type in symbols having a symbol type of downlink symbol or flexible symbol with no indication of availability per RB set in symbols having a symbol type of uplink symbol, indication of availability per RB set associated with a soft type in symbols having a symbol type of uplink symbol or flexible symbol with no indication of availability per RB set in symbols having a symbol type of downlink symbol, or indication of availability per RB set associated with a soft type in all of the symbols.

In Aspect 226, the computer-readable medium of Aspect 224 includes where the configuration indicates the resource availability for the multiple combinations in multiple rows of a table, where each row is arranged by RB set and then slot.

In Aspect 227, the computer-readable medium of Aspect 224 includes where the configuration indicates the resource availability for the multiple combinations in multiple rows of a table, where each row is arranged by slot then RB set.

In Aspect 228, the computer-readable medium of Aspect 222 includes where the DCI indicates a set of resource availability combinations each corresponding to a different RB set.

In Aspect 229, the computer-readable medium of Aspect 228 includes where the DCI indicates the set of resource availability combinations each corresponding to a different RB set in different rows of a table.

In Aspect 230, the computer-readable medium of Aspect 228 includes where the DCI indicates the set of resource availability combinations in different tables each corresponding to a different RB set.

In Aspect 231, the computer-readable medium of Aspect 222 includes code for transmitting, to the downstream IAB node, a second DCI that indicates the one or more RB sets to which the one resource availability combination applies for the one or more cells of the downstream IAB node.

In Aspect 232, the computer-readable medium of any of Aspects 222 to 231 includes where the configuration indicates the resource availability for only a subset of the multiple slots that include symbols having RB sets associated with a soft type.

Aspect 233 is a method for wireless communication at an IAB node for wireless communication that includes receiving, from an upstream node, a configuration, originated by an IAB donor, for each cell of the IAB node indicating multiple resource availability combinations with each resource availability combination over multiple slots, where each item in each resource availability combination indicates a resource availability for one or more selected RB sets of multiple configured RB sets in one slot, receiving, from the upstream node, a DCI indicating one resource availability combination of the multiple resource availability combinations for one or more cells of the IAB node; and communicating, by the one or more cells of the IAB node and in the one slot, over the one or more selected RB sets in symbols indicated as available by the one resource availability combination.

In Aspect 234, the method of Aspect 233 includes where the resource availability indicated by a given item of the one resource availability combination for the one slot corresponds to the one or more selected RB sets at symbols in the one slot.

In Aspect 235, the method of Aspect 234 includes where the given item indicates the one resource availability combination in the one slot as one of no indication of availability over the one or more selected RB sets associated with a soft type in all of the symbols, indication of availability over the one or more selected RB sets associated with a soft type in symbols having a symbol type of downlink symbol with no indication of availability over the one or more selected RB sets in symbols having a symbol type of uplink symbol or flexible symbol, indication of availability over the one or more selected RB sets associated with a soft type in symbols having a symbol type of uplink symbol with no indication of availability over the one or more selected RB sets in symbols having a symbol type of downlink symbol or flexible symbol, indication of availability over the one or more selected RB sets associated with a soft type in symbols having a symbol type of downlink symbol or uplink symbol with no indication of availability over the one or more selected RB sets in symbols having a symbol type of flexible symbol, indication of availability over the one or more selected RB sets associated with a soft type in symbols having a symbol type of flexible symbol with no indication of availability over the one or more selected RB sets in symbols having a symbol type of downlink symbol or uplink symbol, indication of availability over the one or more selected RB sets associated with a soft type in symbols having a symbol type of downlink symbol or flexible symbol with no indication of availability over the one or more selected RB sets in symbols having a symbol type of uplink symbol, indication of availability over the one or more selected RB sets associated with a soft type in symbols having a symbol type of uplink symbol or flexible symbol with no indication of availability over the one or more selected RB sets in symbols having a symbol type of downlink symbol, or indication of availability over the one or more selected RB sets associated with a soft type in all of the symbols.

In Aspect 236, the method of any of Aspects 233 to 235 includes where the indication of the one or more selected RB sets includes a bitmap, where each bit in the bitmap indicates selection of one RB set of the multiple configured RB sets.

In Aspect 237, the method of any of Aspects 233 to 236 includes where the indication of the one or more selected RB sets includes one or more indices of RB sets corresponding to the one or more selected RB sets.

In Aspect 238, the method of any of Aspects 233 to 236 includes where the indication of one or more selected RB sets is received in the configuration.

In Aspect 239, the method of any of Aspects 233 to 238 includes where the configuration indicates, for each respective slot in each respective resource availability combination of the multiple resource availability combinations, the one or more selected RB sets of the multiple configured RB sets that correspond to the respective slot.

In Aspect 240, the method of any of Aspects 233 to 238 includes where the configuration indicates, for each resource availability combination of the multiple resource availability combinations, the one or more selected RB sets of the multiple configured RB sets that correspond to the respective slot.

In Aspect 241, the method of any of Aspects 233 to 240 includes where the configuration indicates the resource availability for only a subset of the multiple slots that include symbols having RB sets associated with a soft type.

Aspect 242 is a method for wireless communication at a node is provided that includes transmitting, to a downstream IAB node, a configuration for each cell of the downstream IAB node indicating multiple resource availability combinations with each resource availability combination over multiple slots, wherein each item in each resource availability combination indicates a resource availability for one or more selected RB sets of multiple configured RB sets in one slot, and transmitting, to the downstream IAB node, a DCI indicating one resource availability combination of the multiple resource availability combinations for one or more cells of the downstream IAB node.

In Aspect 243, the method of Aspect 242 includes where the resource availability indicated by a given item of the one resource availability combination for the one slot corresponds to the one or more selected RB sets at symbols in the one slot.

In Aspect 244, the method of Aspect 243 includes where the given item indicates the one resource availability combination in the one slot as one of no indication of availability over the one or more selected RB sets associated with a soft type in all of the symbols, indication of availability over the one or more selected RB sets associated with a soft type in symbols having a symbol type of downlink symbol with no indication of availability over the one or more selected RB sets in symbols having a symbol type of uplink symbol or flexible symbol, indication of availability over the one or more selected RB sets associated with a soft type in symbols having a symbol type of uplink symbol with no indication of availability over the one or more selected RB sets in symbols having a symbol type of downlink symbol or flexible symbol, indication of availability over the one or more selected RB sets associated with a soft type in symbols having a symbol type of downlink symbol or uplink symbol with no indication of availability over the one or more selected RB sets in symbols having a symbol type of flexible symbol, indication of availability over the one or more selected RB sets associated with a soft type in symbols having a symbol type of flexible symbol with no indication of availability over the one or more selected RB sets in symbols having a symbol type of downlink symbol or uplink symbol, indication of availability over the one or more selected RB sets associated with a soft type in symbols having a symbol type of downlink symbol or flexible symbol with no indication of availability over the one or more selected RB sets in symbols having a symbol type of uplink symbol, indication of availability over the one or more selected RB sets associated with a soft type in symbols having a symbol type of uplink symbol or flexible symbol with no indication of availability over the one or more selected RB sets in symbols having a symbol type of downlink symbol, or indication of availability over the one or more selected RB sets associated with a soft type in all of the symbols.

In Aspect 245, the method of any of Aspects 242 to 244 includes where the indication of the one or more selected RB sets includes a bitmap, where each bit in the bitmap indicates selection of one RB set of the multiple configured RB sets.

In Aspect 246, the method of any of Aspects 242 to 245 includes where the indication of the one or more selected RB sets includes one or more indices of RB sets corresponding to the one or more selected RB sets.

In Aspect 247, the method of any of Aspects 242 to 246 includes where the indication of one or more selected RB sets is received in the configuration.

In Aspect 248, the method of any of Aspects 242 to 247 includes where the configuration indicates, for each respective slot in each respective resource availability combination of the multiple resource availability combinations, the one or more selected RB sets of the multiple configured RB sets that correspond to the respective slot.

In Aspect 249, the method of any of Aspects 242 to 247 includes where the configuration indicates, for each resource availability combination of the multiple resource availability combinations, the one or more selected RB sets of the multiple configured RB sets that correspond to the respective slot.

In Aspect 250, the method of any of Aspects 242 to 249 includes where the configuration indicates the resource availability for only a subset of the multiple slots that include symbols having RB sets associated with a soft type.

In aspect 251, the method of any of Aspects 242 to 260 includes where the configuration is originated from a IAB donor for the downstream node, and receiving, from the IAB donor or another upstream node, the configuration.

Aspect 252 is an apparatus for wireless communication including a transceiver, a memory configured to store instructions, and one or more processors communicatively coupled with the memory and the transceiver, wherein the one or more processors are configured to perform one or more of the methods of any of Aspects 233 to 251.

Aspect 253 is an apparatus for wireless communication including means for performing one or more of the methods of any of Aspects 233 to 251.

Aspect 254 is a computer-readable medium including code executable by one or more processors for wireless communications, the code including code for performing one or more of the methods of any of Aspects 233 to 251.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An integrated access and backhaul (IAB) node for wireless communication, comprising:
 a transceiver;
 a memory configured to store instructions; and
 one or more processors communicatively coupled with the memory and the transceiver, wherein the one or more processors are configured to:
  receive, from an upstream node, a configuration, originated by an IAB donor, for each cell of the IAB node indicating multiple resource availability combinations with each resource availability combination over multiple slots, wherein each item in each resource availability combination indicates a resource availability for one or more selected resource block (RB) sets, associated with a soft type, of multiple configured RB sets, wherein the multiple configured RB sets are configured, per RB set in a time domain of multiple symbols in one slot, as one of a hard type, the soft type, or an unavailable type, wherein the multiple configured RB sets include at least a first RB set that is associated with the soft type in a first symbol of the one slot and at least a second RB set that is associated with the hard type or the unavailable type in a second symbol of the one slot, and wherein the first RB set and the second RB set are associated with a same frequency;
  receive, from the upstream node, a downlink control information (DCI) indicating one resource availability combination of the multiple resource availability combinations for one or more cells of the IAB node; and
  communicate, by the one or more cells of the IAB node and in the one slot, over the one or more selected RB sets in symbols indicated as available by the one resource availability combination.

2. The IAB node of claim 1, wherein the resource availability indicated by a given item of the one resource availability combination for the one slot corresponds to the one or more selected RB sets at symbols in the one slot.

3. The IAB node of claim 2, wherein the given item indicates the one resource availability combination in the one slot as one of:
 no indication of availability over the one or more selected RB sets associated with the soft type in all of the symbols;
 indication of availability over the one or more selected RB sets associated with the soft type in symbols having a symbol type of downlink symbol with no indication of availability over the one or more selected RB sets in symbols having a symbol type of uplink symbol or flexible symbol;
 indication of availability over the one or more selected RB sets associated with the soft type in symbols having a symbol type of uplink symbol with no indication of availability over the one or more selected RB sets in symbols having a symbol type of downlink symbol or flexible symbol;
 indication of availability over the one or more selected RB sets associated with the soft type in symbols having a symbol type of downlink symbol or uplink symbol with no indication of availability over the one or more selected RB sets in symbols having a symbol type of flexible symbol;
 indication of availability over the one or more selected RB sets associated with the soft type in symbols having a symbol type of flexible symbol with no indication of availability over the one or more selected RB sets in symbols having a symbol type of downlink symbol or uplink symbol;
 indication of availability over the one or more selected RB sets associated with the soft type in symbols having a symbol type of downlink symbol or flexible symbol with no indication of availability over the one or more selected RB sets in symbols having a symbol type of uplink symbol;

indication of availability over the one or more selected RB sets associated with the soft type in symbols having a symbol type of uplink symbol or flexible symbol with no indication of availability over the one or more selected RB sets in symbols having a symbol type of downlink symbol; or indication of availability over the one or more selected RB sets associated with the soft type in all of the symbols.

4. The IAB node of claim 1, wherein the indication of the one or more selected RB sets includes a bitmap, where each bit in the bitmap indicates selection of one RB set of the multiple configured RB sets.

5. The IAB node of claim 1, wherein the indication of the one or more selected RB sets includes one or more indices of RB sets corresponding to the one or more selected RB sets.

6. The IAB node of claim 1, wherein the indication of one or more selected RB sets is received in the configuration.

7. The IAB node of claim 1, wherein the configuration indicates, for each respective slot in each respective resource availability combination of the multiple resource availability combinations, the one or more selected RB sets of the multiple configured RB sets that correspond to the respective slot.

8. The IAB node of claim 1, wherein the configuration indicates, for each resource availability combination of the multiple resource availability combinations, the one or more selected RB sets of the multiple configured RB sets that correspond to the respective slot.

9. The IAB node of claim 1, wherein the configuration indicates the resource availability for only a subset of the multiple slots that include symbols having RB sets associated with the soft type.

10. A node for wireless communication, comprising:
a transceiver;
a memory configured to store instructions; and
one or more processors communicatively coupled with the memory and the transceiver, wherein the one or more processors are configured to:
transmit, to a downstream integrated access and backhaul (IAB) node, a configuration for each cell of the downstream IAB node indicating multiple resource availability combinations with each resource availability combination over multiple slots, wherein each item in each resource availability combination indicates a resource availability for one or more selected resource block (RB) sets, associated with a soft type, of multiple configured RB sets, wherein the multiple configured RB sets are configured, per RB set in a time domain of multiple symbols in one slot, as one of a hard type, the soft type, or an unavailable type, wherein the multiple configured RB sets include at least a first RB set that is associated with the soft type in a first symbol of the one slot and at least a second RB set that is associated with the hard type or the unavailable type in a second symbol of the one slot, and wherein the first RB set and the second RB set are associated with a same frequency; and
transmit, to the downstream IAB node, a downlink control information (DCI) indicating one resource availability combination of the multiple resource availability combinations for one or more cells of the downstream IAB node.

11. The node of claim 10, wherein the resource availability indicated by a given item of the one resource availability combination for the one slot corresponds to the one or more selected RB sets at symbols in the one slot.

12. The node of claim 11, wherein the given item indicates the one resource availability combination in the one slot as one of:
no indication of availability over the one or more selected RB sets associated with the soft type in all of the symbols;
indication of availability over the one or more selected RB sets associated with the soft type in symbols having a symbol type of downlink symbol with no indication of availability over the one or more selected RB sets in symbols having a symbol type of uplink symbol or flexible symbol;
indication of availability over the one or more selected RB sets associated with the soft type in symbols having a symbol type of uplink symbol with no indication of availability over the one or more selected RB sets in symbols having a symbol type of downlink symbol or flexible symbol;
indication of availability over the one or more selected RB sets associated with the soft type in symbols having a symbol type of downlink symbol or uplink symbol with no indication of availability over the one or more selected RB sets in symbols having a symbol type of flexible symbol;
indication of availability over the one or more selected RB sets associated with the soft type in symbols having a symbol type of flexible symbol with no indication of availability over the one or more selected RB sets in symbols having a symbol type of downlink symbol or uplink symbol;
indication of availability over the one or more selected RB sets associated with the soft type in symbols having a symbol type of downlink symbol or flexible symbol with no indication of availability over the one or more selected RB sets in symbols having a symbol type of uplink symbol;
indication of availability over the one or more selected RB sets associated with the soft type in symbols having a symbol type of uplink symbol or flexible symbol with no indication of availability over the one or more selected RB sets in symbols having a symbol type of downlink symbol; or
indication of availability over the one or more selected RB sets associated with the soft type in all of the symbols.

13. The node of claim 10, wherein the indication of the one or more selected RB sets includes a bitmap, where each bit in the bitmap indicates selection of one RB set of the multiple configured RB sets.

14. The node of claim 10, wherein the indication of the one or more selected RB sets includes one or more indices of RB sets corresponding to the one or more selected RB sets.

15. The node of claim 10, wherein the indication of one or more selected RB sets is received in the configuration.

16. The node of claim 10, wherein the configuration indicates, for each respective slot in each respective resource availability combination of the multiple resource availability combinations, the one or more selected RB sets of the multiple configured RB sets that correspond to the respective slot.

17. The node of claim 10, wherein the configuration indicates, for each resource availability combination of the multiple resource availability combinations, the one or more selected RB sets of the multiple configured RB sets that correspond to the respective slot.

18. The node of claim 10, wherein the configuration indicates the resource availability for only a subset of the multiple slots that include symbols having RB sets associated with the soft type.

19. The node of claim 10, wherein the configuration is originated from a IAB donor for the downstream node, and further comprising receiving, from the IAB donor or another upstream node, the configuration.

20. A method for wireless communication at an integrated access and backhaul (IAB) node, comprising:
receiving, from an upstream node, a configuration for each cell of the IAB node indicating multiple resource availability combinations with each resource availability combination over multiple slots, wherein each item in each resource availability combination indicates a resource availability for one or more selected resource block (RB) sets, associated with a soft type, of multiple configured RB sets, wherein the multiple configured RB sets are configured, per RB set in a time domain of multiple symbols in one slot, as one of a hard type, the soft type, or an unavailable type, wherein the multiple configured RB sets include at least a first RB set that is associated with the soft type in a first symbol of the one slot and at least a second RB set that is associated with the hard type or the unavailable type in a second symbol of the one slot, and wherein the first RB set and the second RB set are associated with a same frequency;
receiving, from the upstream node, a downlink control information (DCI) indicating one resource availability combination of the multiple resource availability combinations for one or more cells of the IAB node; and
communicating, by the one or more cells of the IAB node and in the one slot, over the one or more selected RB sets in symbols indicated as available by the one resource availability combination.

21. The method of claim 20, wherein the resource availability indicated by a given item of the one resource availability combination for the one slot corresponds to the one or more selected RB sets at symbols in the one slot.

22. The method of claim 21, wherein the given item indicates the one resource availability combination in the one slot as one of:
no indication of availability over the one or more selected RB sets associated with the soft type in all of the symbols;
indication of availability over the one or more selected RB sets associated with the soft type in symbols having a symbol type of downlink symbol with no indication of availability over the one or more selected RB sets in symbols having a symbol type of uplink symbol or flexible symbol;
indication of availability over the one or more selected RB sets associated with the soft type in symbols having a symbol type of uplink symbol with no indication of availability over the one or more selected RB sets in symbols having a symbol type of downlink symbol or flexible symbol;
indication of availability over the one or more selected RB sets associated with the soft type in symbols having a symbol type of downlink symbol or uplink symbol with no indication of availability over the one or more selected RB sets in symbols having a symbol type of flexible symbol;
indication of availability over the one or more selected RB sets associated with the soft type in symbols having a symbol type of flexible symbol with no indication of availability over the one or more selected RB sets in symbols having a symbol type of downlink symbol or uplink symbol;
indication of availability over the one or more selected RB sets associated with the soft type in symbols having a symbol type of downlink symbol or flexible symbol with no indication of availability over the one or more selected RB sets in symbols having a symbol type of uplink symbol;
indication of availability over the one or more selected RB sets associated with the soft type in symbols having a symbol type of uplink symbol or flexible symbol with no indication of availability over the one or more selected RB sets in symbols having a symbol type of downlink symbol; or
indication of availability over the one or more selected RB sets associated with the soft type in all of the symbols.

23. The method of claim 20, wherein the indication of the one or more selected RB sets includes a bitmap, where each bit in the bitmap indicates selection of one RB set of the multiple configured RB sets.

24. The method of claim 20, wherein the configuration indicates, for each respective slot in each respective resource availability combination of the multiple resource availability combinations, the one or more selected RB sets of the multiple configured RB sets that correspond to the respective slot.

25. The method of claim 20, wherein the configuration indicates, for each resource availability combination of the multiple resource availability combinations, the one or more selected RB sets of the multiple configured RB sets that correspond to the respective slot.

26. A method for wireless communication at a node, comprising:
transmitting, to a downstream integrated access and backhaul (r) node, a configuration for each cell of the downstream IAB node indicating multiple resource availability combinations with each resource availability combination over multiple slots, wherein each item in each resource availability combination indicates a resource availability for one or more selected resource block (RB) sets, associated with a soft type, of multiple configured RB sets in one slot, wherein the multiple configured RB sets are configured, per RB set in a time domain of multiple symbols in one slot, as one of a hard type, the soft type, or an unavailable type, wherein the multiple configured RB sets include at least a first RB set that is associated with the soft type in a first symbol of the one slot and at least a second RB set that is associated with the hard type or the unavailable type in a second symbol of the one slot, and wherein the first RB set and the second RB set are associated with a same frequency; and
transmitting, to the downstream IAB node, a downlink control information (DCI) indicating one resource availability combination of the multiple resource availability combinations for one or more cells of the downstream IAB node.

27. The method of claim 26, wherein the resource availability indicated by a given item of the one resource availability combination for the one slot corresponds to the one or more selected RB sets at symbols in the one slot.

28. The method of claim 27, wherein the given item indicates the one resource availability combination in the one slot as one of:
- no indication of availability over the one or more selected RB sets associated with the soft type in all of the symbols;
- indication of availability over the one or more selected RB sets associated with the soft type in symbols having a symbol type of downlink symbol with no indication of availability over the one or more selected RB sets in symbols having a symbol type of uplink symbol or flexible symbol;
- indication of availability over the one or more selected RB sets associated with the soft type in symbols having a symbol type of uplink symbol with no indication of availability over the one or more selected RB sets in symbols having a symbol type of downlink symbol or flexible symbol;
- indication of availability over the one or more selected RB sets associated with the soft type in symbols having a symbol type of downlink symbol or uplink symbol with no indication of availability over the one or more selected RB sets in symbols having a symbol type of flexible symbol;
- indication of availability over the one or more selected RB sets associated with the soft type in symbols having a symbol type of flexible symbol with no indication of availability over the one or more selected RB sets in symbols having a symbol type of downlink symbol or uplink symbol;
- indication of availability over the one or more selected RB sets associated with the soft type in symbols having a symbol type of downlink symbol or flexible symbol with no indication of availability over the one or more selected RB sets in symbols having a symbol type of uplink symbol;
- indication of availability over the one or more selected RB sets associated with the soft type in symbols having a symbol type of uplink symbol or flexible symbol with no indication of availability over the one or more selected RB sets in symbols having a symbol type of downlink symbol; or
- indication of availability over the one or more selected RB sets associated with the soft type in all of the symbols.

29. The method of claim 26, wherein the configuration indicates, for each respective slot in each respective resource availability combination of the multiple resource availability combinations, the one or more selected RB sets of the multiple configured RB sets that correspond to the respective slot.

30. The method of claim 26, wherein the configuration indicates, for each resource availability combination of the multiple resource availability combinations, the one or more selected RB sets of the multiple configured RB sets that correspond to the respective slot.

* * * * *